United States Patent
Saraf et al.

(10) Patent No.: US 11,977,918 B2
(45) Date of Patent: May 7, 2024

(54) METHODS, SYSTEMS AND COMPUTER PROGRAM PRODUCTS FOR OPTIMIZING COMPUTER SYSTEM RESOURCE UTILIZATION DURING IN-GAME RESOURCE FARMING

(71) Applicant: NOW.GG, INC., Campbell, CA (US)

(72) Inventors: Suman Saraf, Gurugram (IN); Ravi Prakash, Gurugram (IN); Harsh Singh, Delhi (IN)

(73) Assignee: NOW.GG, Inc., Campbell, CA (US)

( * ) Notice: Subject to any disclaimer, the term of this patent is extended or adjusted under 35 U.S.C. 154(b) by 343 days.

(21) Appl. No.: 17/412,357

(22) Filed: Aug. 26, 2021

(65) Prior Publication Data

US 2022/0066825 A1    Mar. 3, 2022

Related U.S. Application Data

(60) Provisional application No. 63/090,788, filed on Oct. 13, 2020.

(30) Foreign Application Priority Data

Aug. 26, 2020 (IN) .............. 202011036829

(51) Int. Cl.
G06F 9/46 (2006.01)
A63F 13/60 (2014.01)
G06F 9/50 (2006.01)

(52) U.S. Cl.
CPC ............ *G06F 9/5005* (2013.01); *A63F 13/60* (2014.09)

(58) Field of Classification Search
CPC .............................. G06F 9/5005; A63F 13/60
See application file for complete search history.

*Primary Examiner* — Gregory A Kessler
(74) *Attorney, Agent, or Firm* — The Webb Law Firm

(57) ABSTRACT

The invention presents methods, systems and computer program products for optimizing computer system resource utilization during in-game resource farming. The invention comprises (i) detecting a gameplay event that triggers switching from a resource farming mode to a non-resource farming mode, or for switching from a non-resource farming mode to a resource farming mode, in connection with a runtime instance of a gaining application software, (ii) identifying a guest operating system within which the runtime instance of the gaming application software is being executed, (iii) selecting a mode switching protocol implementable within the identified guest operating system, and (iv) switching the runtime instance of the gaming application software from a resource farming mode to a non-resource farming mode, or from a non-resource farming mode to a resource farming mode, by implementing the selected mode switching protocol.

13 Claims, 14 Drawing Sheets

METHODS, SYSTEMS AND COMPUTER PROGRAM PRODUCTS FOR OPTIMIZING COMPUTER SYSTEM RESOURCE UTILIZATION DURING IN-GAME RESOURCE FARMING

CROSS-REFERENCE TO RELATED APPLICATIONS

This application claims priority to Indian Patent Application No. 202011036829 filed Aug. 26, 2020, and U.S. Provisional Patent Application No. 63/090,788, filed Oct. 13, 2020, the disclosures of which are hereby incorporated by reference in their entirety.

FIELD OF THE INVENTION

The present invention relates to gaming technologies. In particular, the present invention relates to methods, systems and computer program products for optimizing computer system resource utilization during in-game resource farming.

BACKGROUND

For the purposes of the invention, the term "gold farming" or "resource farming" may be used interchangeably and shall each refer to the practice of gathering and selling virtual resources, virtual currency, experience points, or goods in online games—for trade, barter, in-game currency or real money.

The steady growth of Massively Multiplayer Online Role Playing Games (MMORPG) has contributed to the widespread practice of resource farming. In brief, resource farming is premised on the fact that obtaining virtual goods such as in-game currency, scarce commodities, experience points, powerful weapons and/or other difficult to obtain virtual artefacts within an online game requires substantial investments of time on the part of gameplayers—and that such resources can alternatively be obtained from other gameplayers through trade, purchase or exchange. Resource farming refers to practices that involve the collection and sale of virtual in-game resources for real-world money. The term "resource farming" describes a variety of types of repetitive actions or practices to accumulate valuable virtual resources or artefacts, which the farming gameplayers can sell to other gameplayers (for example, gameplayers who lack the time or initiative to accumulate their own in-game resources), including for real money transactions outside of the game.

Over time, resource farming has transitioned from being viewed as a deviant or undesirable gaming strategy, to an accepted and valuable part of in-game economies, that increases and sustains interest in a game, by enabling gameplayers to level-up or otherwise strengthen their in-game characters by purchasing in-game resources from resource farmers, and thereby avoiding the need to spend large amounts of time dedicated to farming resources for themselves, Some games now even have auto play modes where a gameplayer's character battles automatically under little or no supervision from the gameplayer to accrue in-game experience and/or virtual resources or artefacts. Serious garners typically create many accounts and grind through them in the hope of finding some rare (and random) artefacts which can thereafter be accumulated from across the multiple accounts associated with the gameplayer, into a primary account.

It has been found that cross-operating system based virtual machine environments (which enable applications that are developed for a first operating system (for example the Android OS), to be executed on a machine running a second operating system as a host operating system (for example, the macOS™ or Windows™ operating systems)), offer certain unexpected advantages for in-game resource farming.

A direct benefit of playing games within such environments (for example within the BlueStacks® Android OS emulator for computing devices) is that a player can launch an Android game within a virtual machine environment implemented on a computing device such as a desktop or a laptop device, put it into auto-play mode or resource farming mode and continue with other tasks on the same device, periodically checking the emulator or virtual machine environment to ascertain progress. Doing this on a mobile device running the android OS consumes battery, network, CPU and memory resources, and does not allow the mobile device to be available for any other productive work. However, on a laptop of computing device, a user can initiate multiple instances of a game within multiple instances of a virtual machine environment, and put each instance of the game in auto-play or resource farming mode, thereby increasing the likely returns per unit of real-time as a result of the multiple instances of the game being simultaneously run in farming or auto-play mode. This is not possible on a mobile device, simply because a typical mobile device may lack the processing resources to enable multiple instances of an android game to be run simultaneously.

Even with the option of running games in resource farming mode on a device other than a mobile device, it has been found that running multiple instances of resource heavy games on computing devices such as a laptop or desktop can consume a significant portion of the system resources, thereby making the device unavailable or ineffective for simultaneously executing other computing tasks or for simultaneously carrying out other productivity related tasks on the computing device.

There is accordingly a need for a solution that optimizes computer system resource utilization during in-game resource farming.

SUMMARY

The provides methods, systems and computer program products for optimizing computer system resource utilization during in-game resource farming.

In an embodiment the invention provides a method for optimizing computer system resource utilization during in-game resource farming, comprising implementing within a processor based computing device, the steps of (i) detecting a first gameplay event that has been defined as a trigger for switching from a first resource farming mode to a first non-resource farming mode, or for switching from a first non-resource farming mode to a first resource farming mode, in connection with a first runtime instance of a first gaming application software, (ii) identifying a first guest operating system within which the first runtime instance of the gaming application software is being executed within a corresponding first virtual machine within the computing device, (iii) selecting a first mode switching protocol implementable within the identified first guest operating system, and (iv) switching the first runtime instance of the gaming application software from a first resource farming mode to a first non-resource farming mode, or from a first non-resource farming mode to a first resource farming mode, by implementing the selected first mode switching protocol.

The method may further comprise implementing within the computing device, the steps of (i) detecting a second gameplay event that has been defined as a trigger for switching from a second resource farming mode to a second non-resource farming mode, or for switching from a second non-resource farming mode to a second resource farming mode, in connection with a second runtime instance of a second gaming application software, wherein both the first runtime instance of the first gaming application software and the second runtime instance of the second gaming application software are being implemented within the computing device, (ii) identifying a second guest operating system within which the second runtime instance of the gaming application software is being executed within a corresponding second virtual machine within the computing device, (iii) selecting a second mode switching protocol implementable within the identified second guest operating system, and (iv) switching the second runtime instance of the gaming application software from a second resource farming mode to a second non-resource farming mode, or from a second non-resource farming mode to a second resource farming mode, by implementing the selected second mode switching protocol.

In a further method embodiment, each of the first mode switching protocol and the second mode switching protocol is selected from a plurality of mode switching protocols.

In a particular embodiment of the method each mode switching protocol within the plurality of mode switching protocols is different from other mode switching protocols within the plurality of mode switching protocols.

In another embodiment of the method (i) one or more other mode switching protocols within the plurality of mode switching protocols are incompatible with the first guest operating system, or (ii) one or more other mode switching protocols within the plurality of mode switching protocols are incompatible with the second guest operating system.

In a specific method embodiment, (i) the first resource farming mode is more energy efficient than, or is more computing resource efficient than, or consumes fewer computer resources than the first non-resource farming mode, or (ii) the second resource farming mode is more energy efficient than, or is more computing resource efficient than, or consumes fewer computer resources than second non-resource farming mode.

The invention additionally provides a system for optimizing computer system resource utilization during in-game resource farming, comprising a computing device including at least one memory and a processor, and configured for (i) detecting a first gameplay event that has been defined as a trigger for switching from a first resource farming mode to a first non-resource farming mode, or for switching from a first non-resource farming mode to a first resource farming mode, in connection with a first runtime instance of a first gaming application software, (ii) identifying a first guest operating system within which the first runtime instance of the gaming application software is being executed within a corresponding first, virtual machine within the computing device, (iii) selecting a first mode switching protocol implementable within the identified first guest operating system, and (iv) switching the first runtime instance of the gaming application software from a first resource farming mode to a first non-resource farming mode, or from a first non-resource farming mode to a first resource farming mode, by implementing the selected first mode switching protocol.

In an embodiment, the system may be further configured to implement within the computing device, the steps of (i) detecting a second gameplay event that has been defined as a trigger for switching from a second resource farming mode to a second non-resource farming mode, or for switching from a second non-resource farming mode to a second resource farming mode, in connection with a second runtime instance of a second gaming application software, wherein both the first runtime instance of the first gaming application software and the second runtime instance of the second gaming application software are being implemented within the computing device, (ii) identifying a second guest operating system within which the second runtime instance of the gaming application software is being executed within a corresponding second virtual machine within the computing device, (iii) selecting a second mode switching protocol implementable within the identified second guest operating system, and (iv) switching the second runtime instance of the gaming application software from a second resource farming mode to a second non-resource farming mode, or from a second non-resource farming mode to a second resource farming mode, by implementing the selected second mode switching protocol.

In another system embodiment, each of the first mode switching protocol and the second mode switching protocol is selected from a plurality of mode switching protocols.

In a further system embodiment, each mode switching protocol within the plurality of mode switching protocols is different from other mode switching protocols within the plurality of mode switching protocols.

In yet another system embodiment, (i) one or more other mode switching protocols within the plurality of mode switching protocols are incompatible with the first guest operating system, or (ii) one or more other mode switching protocols within the plurality of mode switching protocols are incompatible with the second guest operating system.

The system may be configured such that (i) the first resource farming mode is more energy efficient than, or is more computing resource efficient than, or consumes fewer computer resources than the first non-resource farming mode, or (ii) the second resource farming mode is more energy efficient than, or is more computing resource efficient than, or consumes fewer computer resources than second non-resource farming mode.

The invention also provides computer program product for optimizing computer system resource utilization during in-game resource farming, the computer program product comprising a non-transitory computer usable medium having computer readable program code embodied therein, the computer readable program code comprising instructions for implementing at a processor, the steps of (i) detecting a first gameplay event that has been defined as a trigger for switching from a first resource farming mode to a first non-resource farming mode, or for switching from a first non-resource farming mode to a first resource farming mode, in connection with a first runtime instance of a first gaming application software, (ii) identifying a first guest operating system within which the first runtime instance of the gaming application software is being executed within a corresponding first virtual machine within the computing device, (iii) selecting a first mode switching protocol implementable within the identified first guest operating system, and (iv) switching the first runtime instance of the gaming application software from a first resource farming mode to a first non-resource farming mode, or from a first non-resource farming mode to a first resource farming mode, by implementing the selected first mode switching protocol.

In various embodiments of the above described methods, systems or computer program products:

- detecting a gameplay event (i.e. either of the first gameplay event or the second gameplay event) may comprise detecting any of retrieved game settings, virtual machine environment settings, operating system settings, operating system emulator settings, received gameplayer inputs, gameplay action(s) or gameplay outcomes, and/or
- (i) each resource farming mode and corresponding non-resource farming mode may comprise a discrete set of gaming application execution parameters, and/or (ii) a first set of gaming application execution parameters corresponding to a resource farming mode is different from a second set of gaming application execution parameters corresponding to a non-resource mode, and/or
- a first set of gaming application execution parameters corresponding to a resource farming mode enables implementation of one or more resource optimization techniques for executing the runtime instance of the gaming application software that are not enabled by a second set of gaming application execution parameters corresponding to a non-resource farming mode— wherein said resource optimization techniques include any of virtual central processing unit (vCPU) allocation, central processing unit (CPU) throttling, frame rate throttling, random access memory (RAM) reclaim, graphics scaling, graphics processing unit (GPU) switching, audio scaling and/or audio muting, and/or
- in a resource farming mode, responsive to detecting that a runtime instance of the gaming application software generates threads with specific thread names (i) independent audio loop corresponding to the runtime instance of the gaming application software is identified, and (ii) the identified independent audio loop is throttled or muted, and/or
- in a resource farming mode, responsive to identifying a particular sequence of application program interface (API) calls in a specific process thread corresponding to the runtime instance of a gaining application software, wherein the sequence of API calls correspond to graphics threads within a gaming engine for the runtime instance of the gaming application software and do not correspond with physics threads within the gaming engine, a frame rate of the executing instance of the gaming application may be throttled, and/or
- in a resource farming mode, responsive to determining that the runtime instance of a gaming application software is rendering full scene frames at periodic intervals, frame data corresponding to the executing instance of the gaming application is downscaled or discarded entirely without saving, and/or
- in a resource farming mode, responsive to determining that a runtime instance of the gaming application software is rendering scene frames only once, downscaling or discarding of frame data corresponding to the executing instance of the gaining application is accompanied by saving of the frame data prior to downscaling or discarding.

BRIEF DESCRIPTION OF THE ACCOMPANYING DRAWINGS

Figure 12:
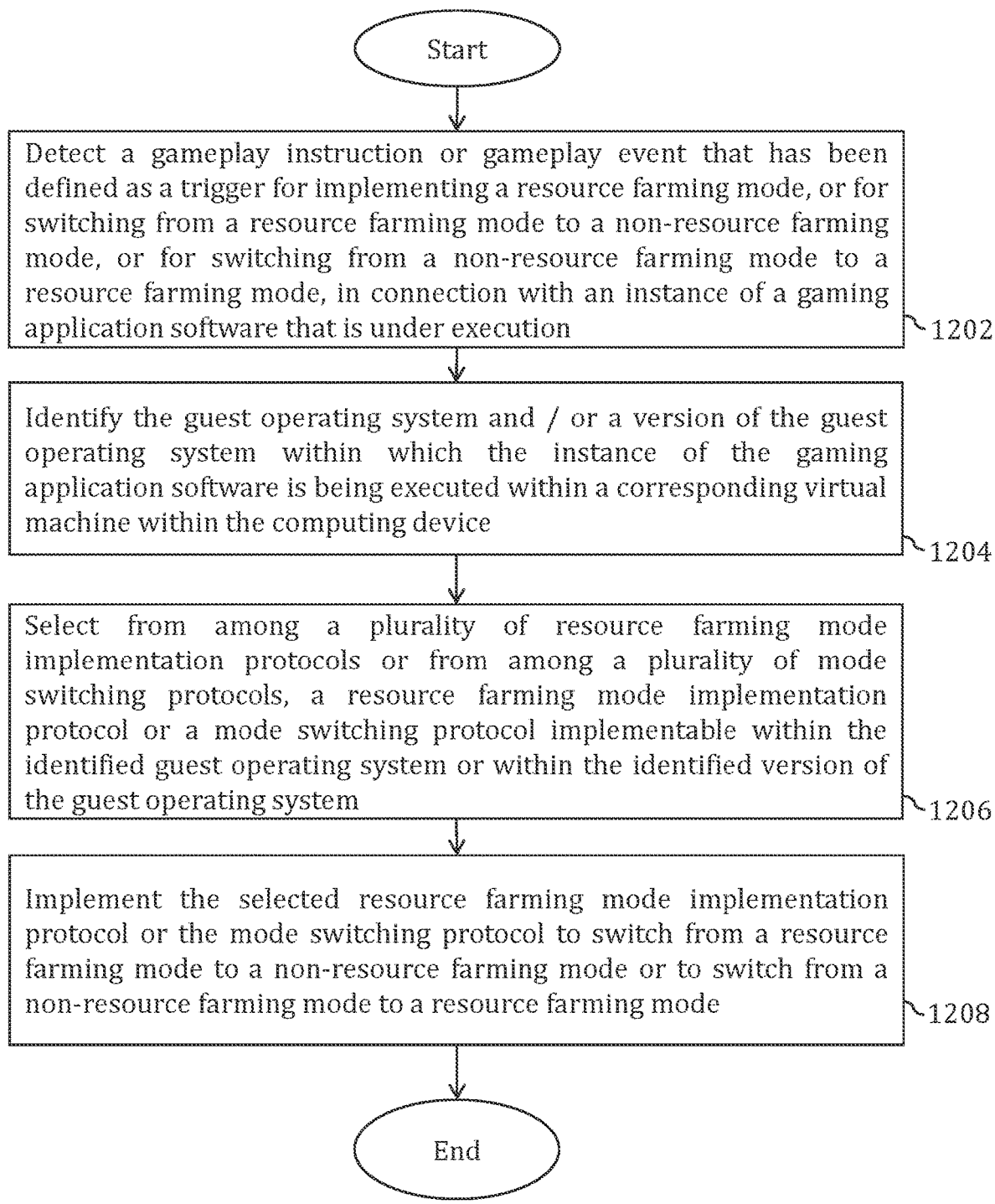
Figure 13:
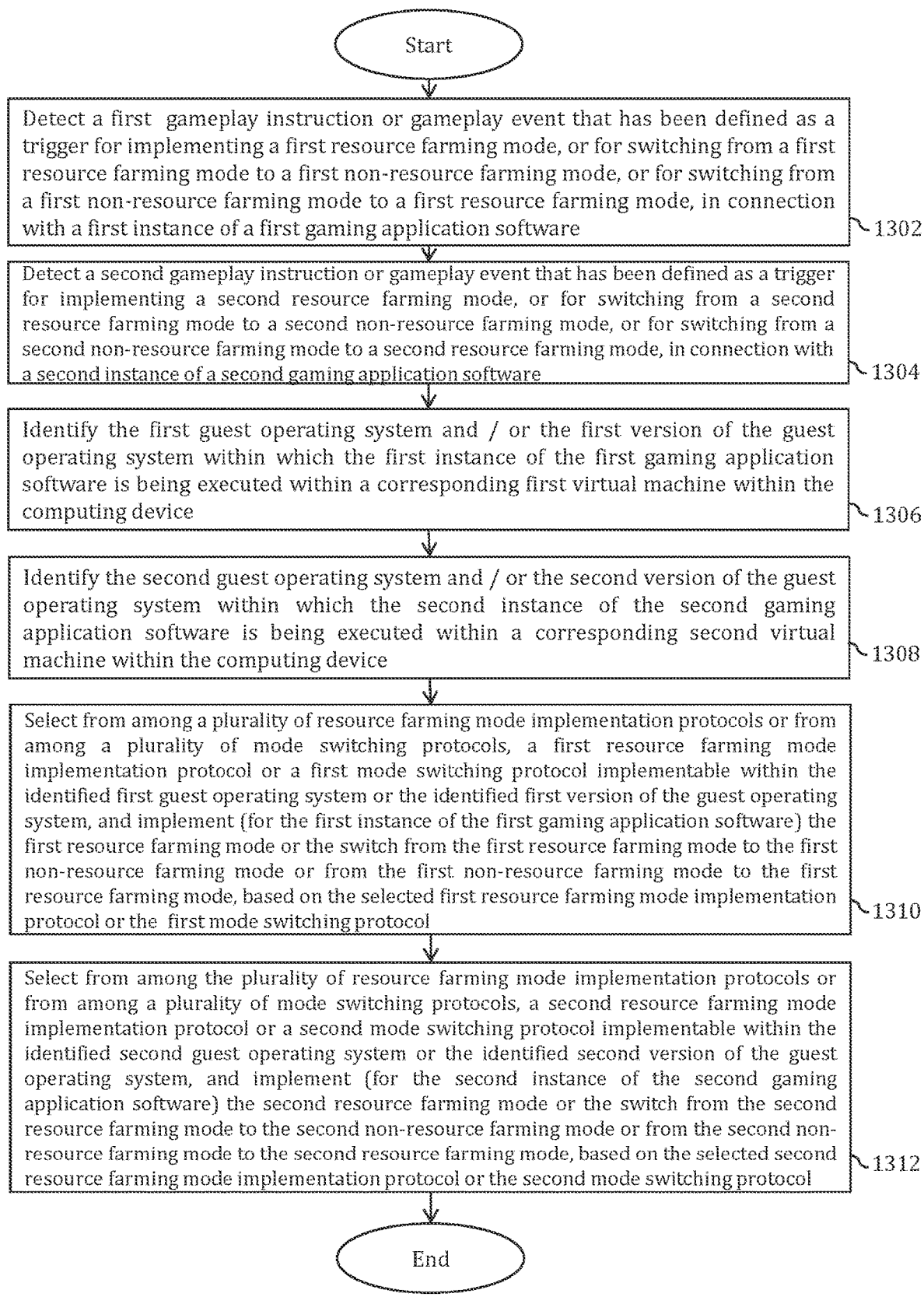

FIGS. 12 and 13 are flowcharts respectively illustrating methods of selecting and implementing resource farming modes, or for selecting switching protocols for switching between a resource farming gaming application mode and a non-resource farming gaming application mode, wherein the selection and implementation is based on a guest operating system within which the gaming application software is being executed.

Figure 14:
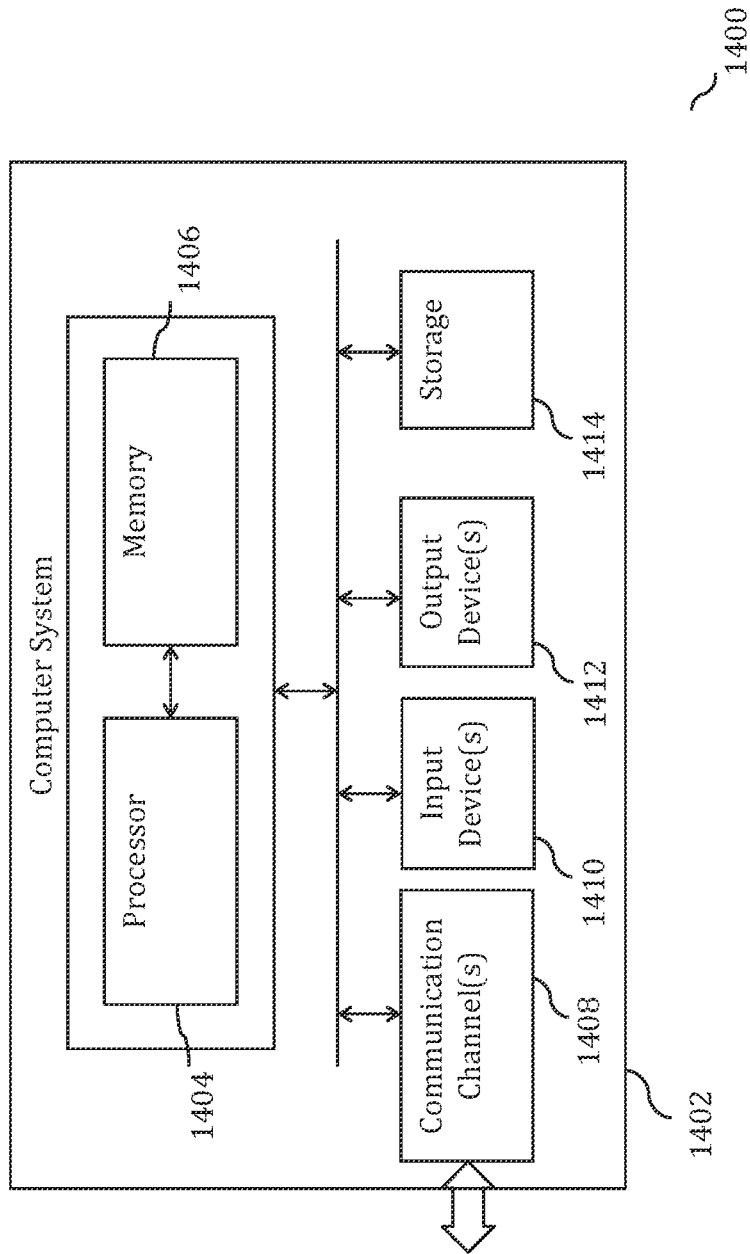

FIG. 14 illustrates an exemplary computer system that is capable of implementing the present invention.

DETAILED DESCRIPTION

The present invention enables optimizing of computer system resource utilization during in-game resource farming.

Figure 1:
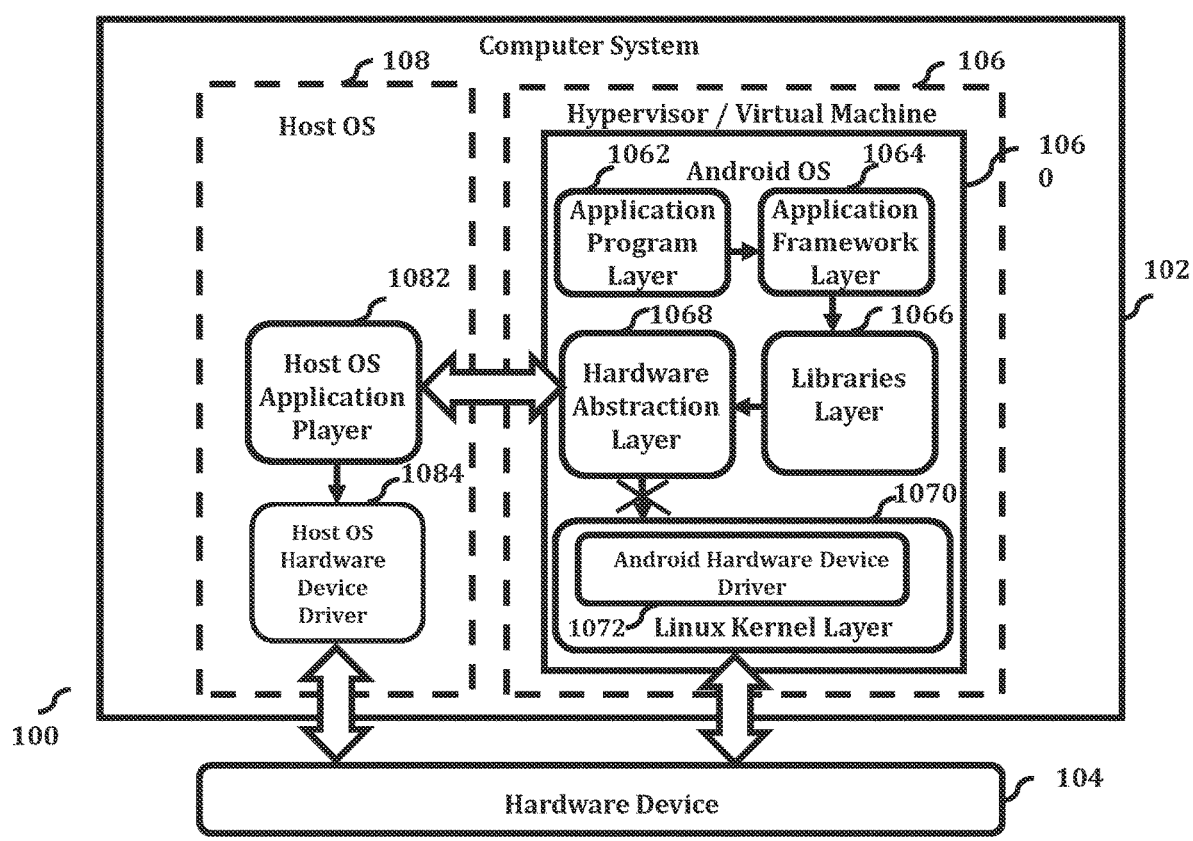
FIG. 1 illustrates an exemplary computer implemented architecture configured for execution of an application player that is configured for executing a guest operating system within a host operating system.

FIG. 1 illustrates an exemplary system for a computer implemented architecture configured for execution of an application player that is configured for executing a guest operating system within a host operating system.

The system 100 illustrated in FIG. 1 is a computer system architecture configured for enabling execution of a software program (for example a virtual machine program) written for a guest operating system, within a host operating system 108 implemented on the computer system 100. The illustrated computer system architecture includes a guest operating system architecture 1060 (in this example Android architecture) and a host operating system architecture 108 (for example a Windows/OS X architecture).

The Android architecture 1060 depicted in FIG. 1 represents a virtual operating system that is launched by executing a host OS software application 106 configured to emulate a hardware architecture capable of implementing the guest OS 1060—which host OS software application 106 may be referred to as virtual software or a hypervisor. Executing the hypervisor 106 creates an instance of a virtual machine on which the guest operating system 1060, e.g., the Android OS, can be run in a manner that is transparent to the end user.

The guest OS/Android OS 1060 may include a software stack including one or more of an application program layer 1062, an application framework layer 1064, a libraries layer 1066, a hardware abstraction layer (HAL) 1068, and a kernel layer 1070. The applications layer 1062 includes various software applications. The application framework layer 1064 is used by developers to access framework application programming interfaces (APIs) and manage the basic functions of a mobile device, laptop, or tablet on which Android is executed, such as resource allocation, switching between processes or programs, phone applications, and keeping track of the physical location of the phone/laptop/tablet. The application framework layer 1064 may include various managers, including an activity manager, a window manager, a content provider manager, a view system manager, a package manager, a telephony manager, a resource manager, a location manager, and a notification manager.

The libraries layer 1066 includes libraries written, e.g., in C, C++, etc., and is used by various systems. The libraries instruct the device executing Android how to handle different kinds of data and are exposed to Android developers via the application framework. Libraries may include, e.g., a surface manager, a media framework library, an SQLite library, an Open GL/ES library, a Free Type library, a WebKit library, an SGL library, an SSL library, and an libc library.

The hardware abstraction layer 1068 provides a standard way to create software hooks (code used to alter or augment the behavior of an operating system, of applications, or of other software components by intercepting function calls or messages or events passed between software components) between the Android platform stack and the underlying hardware. The hardware abstraction layer 1068 also acts as an abstraction layer between the hardware and the rest of the software stack.

The Linux kernel layer 1070 includes Android memory management programs, security settings, power management software and several drivers, such as the device driver for hardware, file system access, networking, and inter-process-communication.

Typically, in operation, an instruction from an Android OS software application to a hardware device (for example an audio or display device) would be routed to a hardware device driver in the corresponding kernel—which driver would thereafter control the operation of the hardware device based on the received instruction. However, since in the illustration shown in FIG. 1, the Android OS 1060 is launched from within the host OS 108, the Android OS 1060 would be run within the host OS 108 as a process or a plurality of processes. Any attempt by an Android application to access the hardware through the Linux drivers in such a device would be meaningless to the host OS 108, because such access is outside of the scope of the host OS 108. Thus, a request for data or an instruction from an Android application would not be sent from the HAL 1068 to the Linux kernel 1070 (as shown by the crossed out communication link in FIG. 1), since Linux kernel hardware device drivers 1072 would be unable to fulfil the request or instruction—which would in turn result in an unintended state or malfunctioning of the hardware.

Instead, such request or instruction would be routed to a host OS application player 1082 via one or more of the application framework layer 1064, the libraries layer 1066, the HAL 1068 and a data channel between the HAL 1068 and the host OS application player 1082—the data channel being configured to enable a request or instruction from an Android application to be relayed to the host OS application player 1082.

The host OS application player 1082 is an application associated with the host OS 108, which is executed by the host OS processor in a user mode layer associated with the host OS (e.g. Windows OS/OS X). Through the host OS application player 1068, applications of the guest operating system/Android operating system 1060 are able to access the host OS hardware device driver(s) 1084, and through said host OS hardware device driver(s) 1084, the hardware and system data of host OS 108.

As noted above, the architecture of FIG. 1 may be included in any device, including without limitation, a workstation, a telephone, a desktop computer, a laptop, a notebook computer, a server, a handheld computer, a media playing device, a gaming system, a mobile computing device, or any other type and/or form of computing, telecommunications, or media device that is capable of communication.

The present invention implements optimized resource utilization mode(s) for execution of gaming application software that can be run in auto-play mode or resource farming mode—such that the computing device can simultaneously run one or more than one instances of the gaining, application software in an optimized resource utilization mode implemented at the computing device—so as to retain availability of sufficient data processing resources to enable a user to simultaneously use the computing device for other data processing or productivity tasks.

The invention implements this optimized resource utilization mode based on the premise that when an instance of a gaming application is being run in auto-play mode or resource farming mode, the gameplayer running the instance of the gaming application is not overly (or at all) concerned with fidelity or quality of the gameplay experience. Instead the gameplayer is (i) concerned that the gameplay character continue to progress in the auto-play mode or resource farming mode (based on the auto-play or resource farming capabilities or controls built into the gaining application), and that the gameplayer can periodically check on progress of the gameplay character, (ii) concerned about ensuring that each simultaneously running instance of a gaming software is implemented in a manner that is efficient in terms of consumption of data processing resources (e.g. processor time and memory)—so as to maximize the number of simultaneous instances of a game that can be run on a computing device and/or to ensure that the computing device can simultaneously be used for non-gaining productivity tasks (e.g. browsing, email communications, word processing, multimedia tasks etc.).

The invention accordingly enables a computing device to execute one or preferably multiple instances of one or more gaming application softwares in energy and resource efficient mode(s) ("resource farming mode(s)") in response to determining that an internal gameplay state of the concerned instance of the gaming application is in a gold farming/resource farming/auto-play gameplay state ("resource farming gameplay state").

Upon determining that an instance of a gaming application that is being executed on a computing device is in a resource farming gameplay state, the computing device may be configured to commence or initiate further execution of such instance of the gaming application in a resource farming mode—which comprises applying one or more resource optimization techniques, including without limitation any one or more of to that specific instance of the gaming application. It would be understood that the applied resource optimization technique results are selected for reducing hardware resource utilization by that specific instance of the gaming application on the computing device. In an embodiment of the invention, the resource optimization technique(s) applied to an instance of a gaming application that is being run in a resource farming gameplay state results in allocation (to that instance of the gaming application) of hardware or processing resources that are different (and preferably fewer/more efficient) than the default hardware or processing resource utilization settings mandated by or associated with the default execution settings of the gaming application (or of that specific instance of the gaming application).

It would be understood that the step of determining that an instance of a gaming application is in a resource farming gameplay state may be achieved in a variety of different ways. In one, the determination is based on querying or retrieving from an executing instance of the gaming application, information regarding whether the gameplayer has selected an auto-play or resource farming gameplay state that is pre-configured within the gaming application itself. In another, rule based or machine learning based analysis of gameplay actions or outcomes within an instance of the gaming application can be used to determine whether the gaming application is in a resource farming gameplay state.

Conversely, in case of a determination that one or more instances of a gaming application are being executed on a computing device in a non-resource farming (i.e. active) gameplay state, the computing device may be configured to execute such instance of the gaming application in a non-resource harming mode, wherein the non-resource farming mode involves allocation of hardware or processing resource to the instance of the gaming application according to default execution settings of the gaming application (or of the specific instance of the gaming application).

It would again be understood that the step of determining that an instance of a gaming application is in a non-farming (or active) gameplay state may be achieved in a variety of different ways. In one, the determination is based on querying or retrieving from the instance of the gaming application, information regarding whether the gameplayer has selected an active mode or alternative an auto-play mode or resource farming mode from among selectable gameplay modes that are pre-configured within the gaming application. In another embodiment, rule based or machine learning based analysis of gameplay actions (for example specific gameplayer inputs or actions or selections) or outcomes (for example detected changes with respect to a particular configuration or gameplay state, viewing of a specific screen or map area, change in scene rendering, change in audio output etc.) within an instance of the gaming application can be used to determine whether the gaming application is in a non-resource farming (i.e. active) gameplay state.

Figure 3:
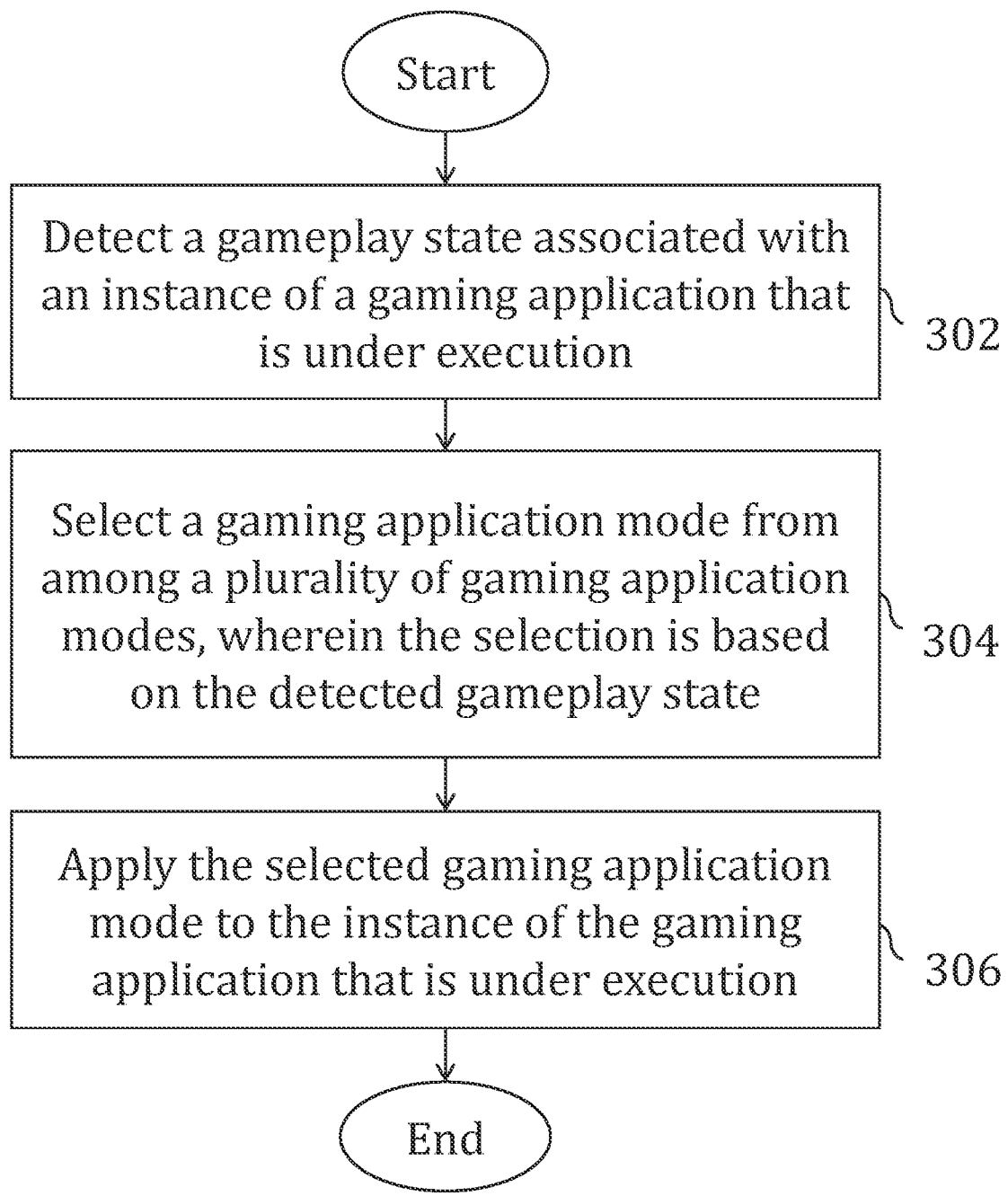
FIG. 3 is a flowchart illustrating a method of selectively applying a gaming application mode to an executing instance of a gaming application, based on a detected gameplay state.

FIG. 3 is a flowchart illustrating a method that applies the above teachings—by selectively applying a gaming application mode to an executing instance of a gaming application, based on a detected gameplay state.

Step 302 comprises detecting a gameplay state associated with an instance of a gaming application that is currently being executed or implemented on a computing device. In an embodiment, the gameplay state detected at step 302 may comprise one of (i) a resource farming gameplay state, auto-play gameplay state, or inactive gameplay state, and (ii) a non-resource farming gameplay state or active gameplay state—presently associated with the instance of the gaming application. The gameplay state may be detected based on retrieved game settings, virtual machine environment settings, operating system settings, operating system emulator settings, and or based on received gameplayer input(s), in more particular embodiments, rule-based or machine-learning based analysis of gameplay actions (for example specific gameplayer inputs or actions or selections) or outcomes (for example detected changes with respect to a particular configuration or gameplay state, viewing of a specific screen or map area, change in scene rendering, change in audio output etc.) within an instance of the gaming application can be used to detect and/or identify a gameplay state—for example, whether the gaming application is in a non-resource farming (i.e. active) gameplay state or in a resource farming gameplay state.

Step 304 comprises selecting a gaming application mode from among a plurality of available gaming application modes, wherein the selection of a particular gaming application mode is based on the gameplay state detected at step 304. Each of the plurality of gaming application modes comprises a defined set of gaming application execution parameters—comprising one or more hardware parameters, operating system parameters, application software parameters, application runtime environment parameters and/or device driver parameters, that are capable of being implemented within a computing system in which the instance of the gaming application is being executed, for the purposes of executing the instance of such instance of the gaming application. In an embodiment, each of the plurality of gaming application modes differs from the remaining gaming application modes in respect of one or more gaming application execution parameters within the defined set of gaming application execution parameters.

In an embodiment of the method of FIG. 3, the plurality of available gaming application modes comprises at least a first resource farming gaming application mode, and a second non-resource farming gaming application mode. In a particular embodiment, the resource farming gaming application is a more energy and/or computing resource efficient mode than the non-resource farming gaming application mode. In a more particular embodiment, a first set of gaming application execution parameters associated with the resource farming gaming application mode enable execution of an instance of a gaming application in a more energy and/or computing resource efficient mode, when compared with a second set of gaming application execution parameters associated with the non-resource farming gaming application mode.

In a further embodiment, the first set of gaming application execution parameters associated with the resource farming gaming application mode is selected to enable or effect implementation of one or more resource optimization techniques (for executing the instance of the gaming application that are not implemented or enabled by the second set of gaming application execution parameters associated with the non-resource farming gaming application mode, Said first set of gaming application execution parameters may include without limitation parameters that result in implementation of one or more of vCPU allocation, CPU throttling, frame rate throttling, RAM reclaim, graphics scaling, CPU switching, audio scaling and/or audio muting.

Step 306 comprises applying the selected gaming application mode to the executing instance of the gaming application. In an embodiment of the method, where the gaming application mode selected at step 304 comprises a resource farming gaming application mode, applying said resource farming gaming application mode to the executing instance of the gaming application comprises implementing a set of gaming application execution parameters that are associated with the resource farming gaming application mode in connection with the executing instance of the gaming application. In an more particular embodiment of the method, where the gaming application mode selected at step 304 comprises a resource farming gaming application mode, applying said resource farming gaming application mode to the executing instance of the gaming application comprises implementing one or more of vCPU allocation, CPU throttling, frame rate throttling, RAM reclaim, graphics scaling, CPU switching, audio scaling and/or audio muting for the purposes of executing the instance of the gaming application.

In another embodiment of the method, where the gaming application mode selected at step 304 comprises a non-resource farming gaming application mode, applying said non-resource farming gaming application mode to the executing instance of the gaming application comprises implementing a set of gaming application execution parameters that are associated with the non-resource farming gaming application mode in connection with execution of the instance of the gaming application.

With regard to the method of FIG. 3, it would be understood that in case of a determination that multiple instances of a gaining application are being executed on a computing device in resource farming gameplay states, the computing device may be configured to execute each such instance of the gaming application in a resource farming gaming application mode, by applying the method steps of FIG. 3. Likewise, in case of a determination that multiple instances of a gaming application are being executed on a computing device in non-resource farming gameplay states, the computing device may be configured to execute each such instance of the gaming application in a non-resource farming mode, by applying the method steps of FIG. 3.

Figure 4:
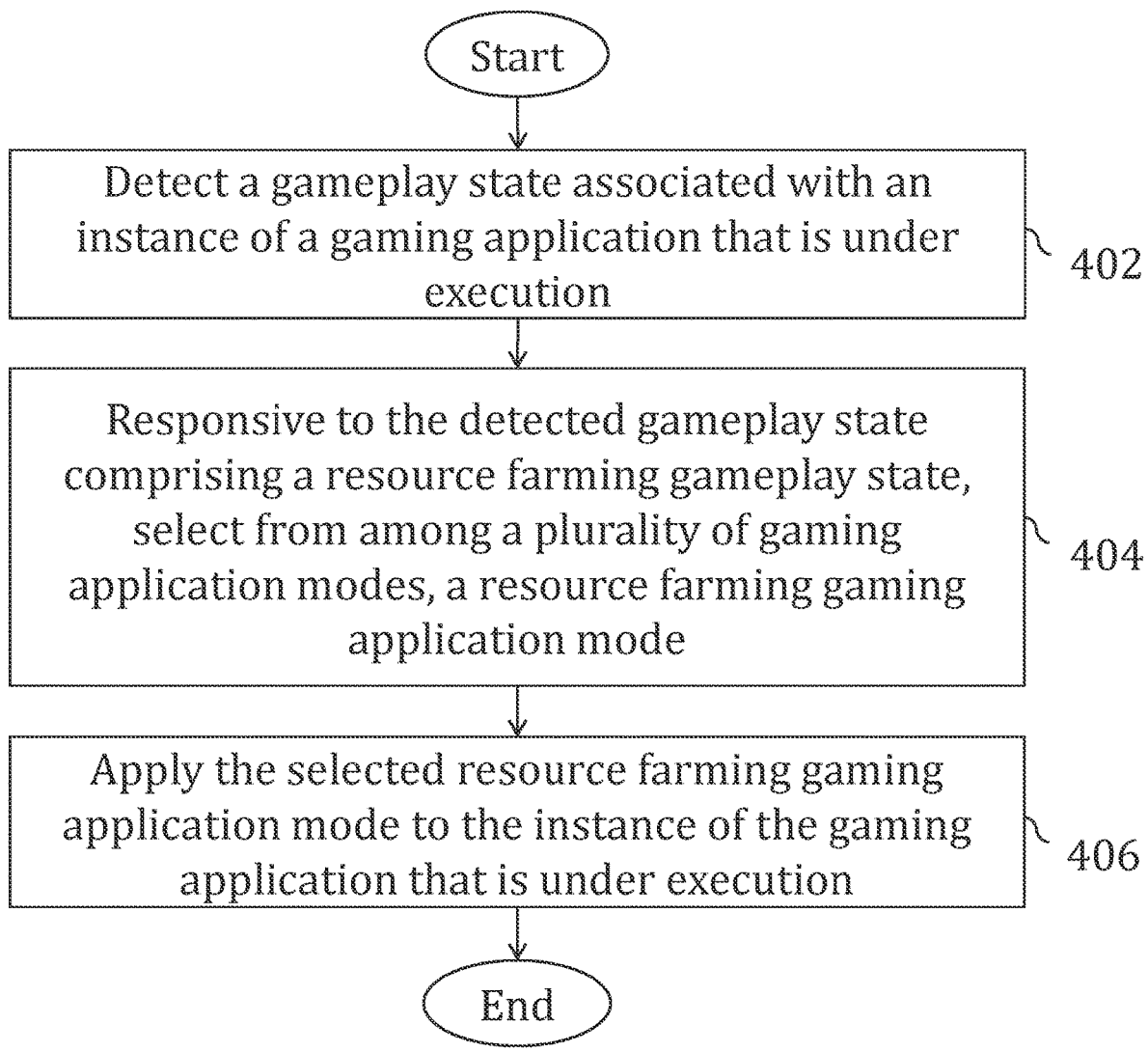
FIG. 4 is a flowchart illustrating a method of selectively applying a resource farming gaming application mode to an executing instance of a gaining application, based on a detected gameplay state.

FIG. 4 is a flowchart illustrating a method of selectively applying a resource farming gaming application mode to an executing instance of a gaming application, based on a detected gameplay state.

Step 402 comprises detecting a gameplay state associated with an instance of a gaming application that is currently being executed or implemented on a computing device. In an embodiment, the gameplay state detected at step 402 may comprise one of (i) a resource farming gameplay state, auto-play gameplay state, or inactive gameplay state, and (ii) a non-resource farming gameplay state or active gameplay state—presently associated with the instance of the gaming application. As in the case of the method of FIG. 3, the gameplay state may be detected based on retrieved game settings, virtual machine environment settings, operating system settings, operating system emulator settings, and or based on received gameplayer input(s). In more particular embodiments, rule-based or machine-learning based analysis of gameplay actions (for example specific gameplayer inputs or actions or selections) or outcomes (for example detected changes with respect to a particular configuration or gameplay state, viewing of a specific screen or map area, change in scene rendering, change in audio output etc.) within an instance of the gaming application can be used to detect and/or identify a gameplay state—for example, whether the gaming application is in a non-resource farming (i.e. active) gameplay state or in a resource farming gameplay state.

Step 404 comprises responding to detection of a resource farming gameplay state at step 402, by selecting a resource farming gaming application mode from among a plurality of available gaming application modes. Each of the plurality of gaming application modes comprises a discrete set of gaming application execution parameters—comprising one or more hardware parameters, operating system parameters, application software parameters, application runtime environment parameters and/or device driver parameters, that are capable of being implemented within a computing system in which the instance of the gaming application is being executed, for the purposes of executing the instance of such instance of the gaming application. In an embodiment of the method of FIG. 4, the plurality of available gaming application modes comprises at least a first resource farming gaming application mode, and a second non-resource farming gaming application mode. In a particular embodiment, the resource farming gaming application mode is a more energy and/or computing resource efficient, mode than the non-resource farming gaming application gaming application mode. In a more particular embodiment, a first set of gaming application execution parameters associated with the resource farming gaming application mode enable execution of an instance of a gaming application in a more energy and/or computing resource efficient mode, when compared with a second set of gaming application execution parameters associated with the non-resource farming gaming application mode.

In a further embodiment, the first set of gaming application execution parameters associated with the resource farming gaming application mode are selected to enable or effect implementation of one or more resource optimization techniques (for executing the instance of the gaming application) that are not implemented or enabled by the second set of gaming application execution parameters associated with the non-resource farming gaming application mode. Said resource optimization techniques may include without limitation, one or more of vCPU allocation, CPU throttling, frame rate throttling, RAM reclaim, graphics scaling, GPU switching, audio sealing and/or audio muting.

Step 406 comprises applying the selected resource farming gaming application mode to the instance of the gaming application that is under execution. In an embodiment of the method, step 406 comprises applying to the executing instance of the gaming application, a set of gaming application execution parameters that are associated with the selected resource farming gaming application mode. In a more particular embodiment of method step 406, applying the resource farming gaming application mode to the executing instance of the gaming application comprises implementing one or more of vCPU allocation, CPU throttling, frame rate throttling, RAM reclaim, graphics scaling, GPU switching, audio scaling and f or audio muting for the purposes of executing the instance of the gaming application.

With regard to the method of FIG. 4, it would be understood that in case of a determination that multiple instances of a gaming application are being executed on a computing device in resource farming gameplay states, the computing device may be configured to execute each such instance of the gaming application in a resource farming mode, by applying the method steps of FIG. 4.

Figure 5:
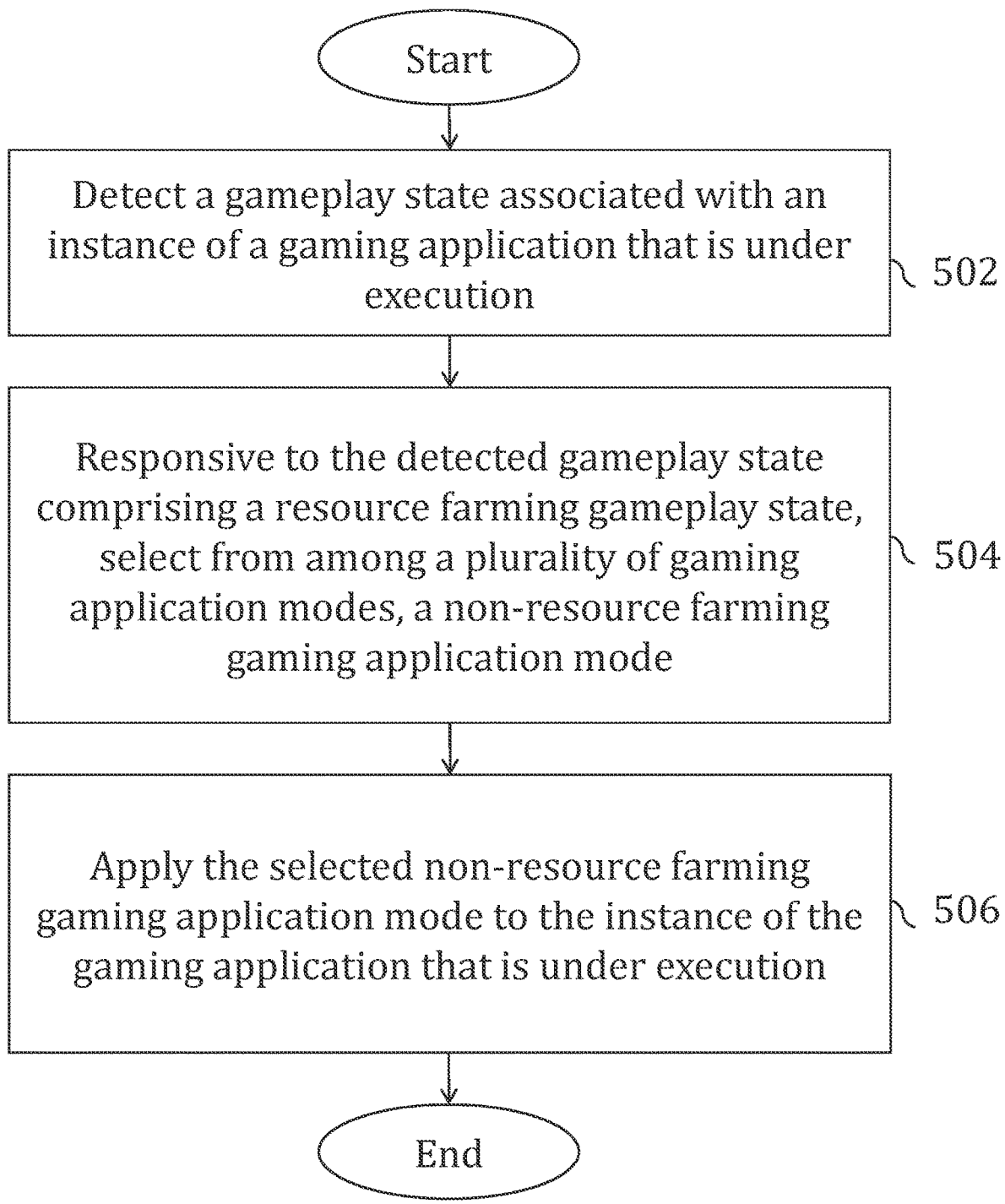
FIG. 5 is a flowchart illustrating a method of selectively applying a non-resource farming gaining application mode to an executing instance of a gaming application, based on a detected gameplay state.

FIG. 5 is a flowchart illustrating a method of selectively applying a non-resource farming gaming application mode to an executing instance of a gaming application, based on a detected gameplay state.

Step 502 comprises detecting a gameplay state associated with an instance of a gaming application that is currently being executed or implemented on a computing device. In an embodiment, the gameplay state detected at step 502 may comprise one of (i) a resource farming gameplay state, auto-play gameplay state, or inactive gameplay state, and (ii) a non-resource farming gameplay state or active gameplay state. As in the case of the methods of FIGS. 3 and 4, the gameplay state may be detected based on retrieved game settings, virtual machine environment settings, operating system settings, operating system emulator settings, and/or based on received gameplayer input(s). In more particular embodiments, rule-based or machine-learning based analysis of detected gameplay actions (for example specific gameplayer inputs or actions or selections) or detected outcomes (for example detected changes with respect to a particular configuration or gameplay state, viewing of a specific screen or map area, change in scene rendering, change in audio output etc.) within an executing instance of the gaming application can be used to detect and/or identify a gameplay state—for example, whether the gaming application is in a non-resource farming (i.e. active) gameplay state or in a resource farming gameplay state.

Step 504 comprises responding to detection of a non-resource farming gameplay state at step 502, by selecting a non-resource farming gaming application mode from among a plurality of available gaming application modes. Each of the plurality of gaming application modes comprises a discrete set of gaming application execution parameters—comprising one or more hardware parameters, operating system parameters, application software parameters, application runtime environment parameters and/or device driver parameters, that are capable of being implemented within a computing system in which the instance of the gaming application is being executed. In an embodiment of the method of FIG. 5, the plurality of available gaming application modes comprises at least a first resource farming gaming application mode, and a second non-resource farming gaming application mode. In a particular embodiment, the non-resource farming gaming application mode is a more energy intensive and/or computing resource intensive mode when compared with the resource farming gaming application gaming application mode. In a more particular embodiment, a first set of gaming application execution parameters associated with the non-resource farming gaming application mode enable execution of an instance of a gaming application in a more energy and/or computing resource intensive mode, when compared with a second set of gaming application execution parameters associated with the resource farming gaming application mode.

In a further embodiment, the second set of gaming application execution parameters associated with the non-resource farming gaming application mode are selected to omit or eliminate or more resource optimization techniques (for executing the instance of the gaming application) which are implemented or enabled by the first set of gaming application execution parameters associated with the resource farming gaming application mode. The one or more omitted or eliminated resource optimization techniques may include without limitation any one or more of, vCPU allocation, CPU throttling, frame rate throttling, RAM reclaim, graphics scaling, GPU switching, audio scaling and/or audio muting.

Step 506 comprises applying the selected non-resource farming gaming application mode to the executing instance of the gaming application. In an embodiment of the method, step 506 comprises applying to the executing instance of the gaming application, a set of gaming application execution parameters that are associated with the non-resource farming gaming application mode, for the purpose of executing the instance of the gaming application. In a more particular embodiment of method step 506, applying the non-resource farming gaming application mode to the executing instance of the gaming application comprises omitting or eliminating one or more of vCPU allocation, CPU throttling, frame rate throttling, RAM reclaim, graphics scaling, GPU switching, audio scaling and/or audio muting while executing the instance of the gaming application.

With regard to the method of FIG. 5, in case of a determination that multiple instances of a gaming application are being executed on a computing device in non-resource farming gameplay states, the computing device may be configured to execute each such instance of the gaming application in a non-resource farming mode, by applying the method steps of FIG. 5.

In certain embodiments, the invention enables switching between a first gaming application mode that is being used for executing an instance of a gaming application, to a second gaming application mode for further execution of the instance of the gaming application, in response to detecting a change in gameplay state. For example, switching from a first gaming application mode to a second gaming application mode, may be implemented in response to determining that gameplay within the executing instance of the gaming application has changed from (i) any of a resource farming gameplay state, auto-play gameplay state, or inactive gameplay state, to (ii) any of a non-resource farming gameplay state or active gameplay state, or vice versa. In an embodiment, the first gaming application mode that is being used for executing an instance of a gaming application may comprise one of a resource farming gaming application mode and a non-resource farming gaming application mode, and the second gaming application mode for executing the instance of the gaming application may comprise the other of the resource farming gaming application mode and the non-resource farming gaming application mode.

Figure 6:
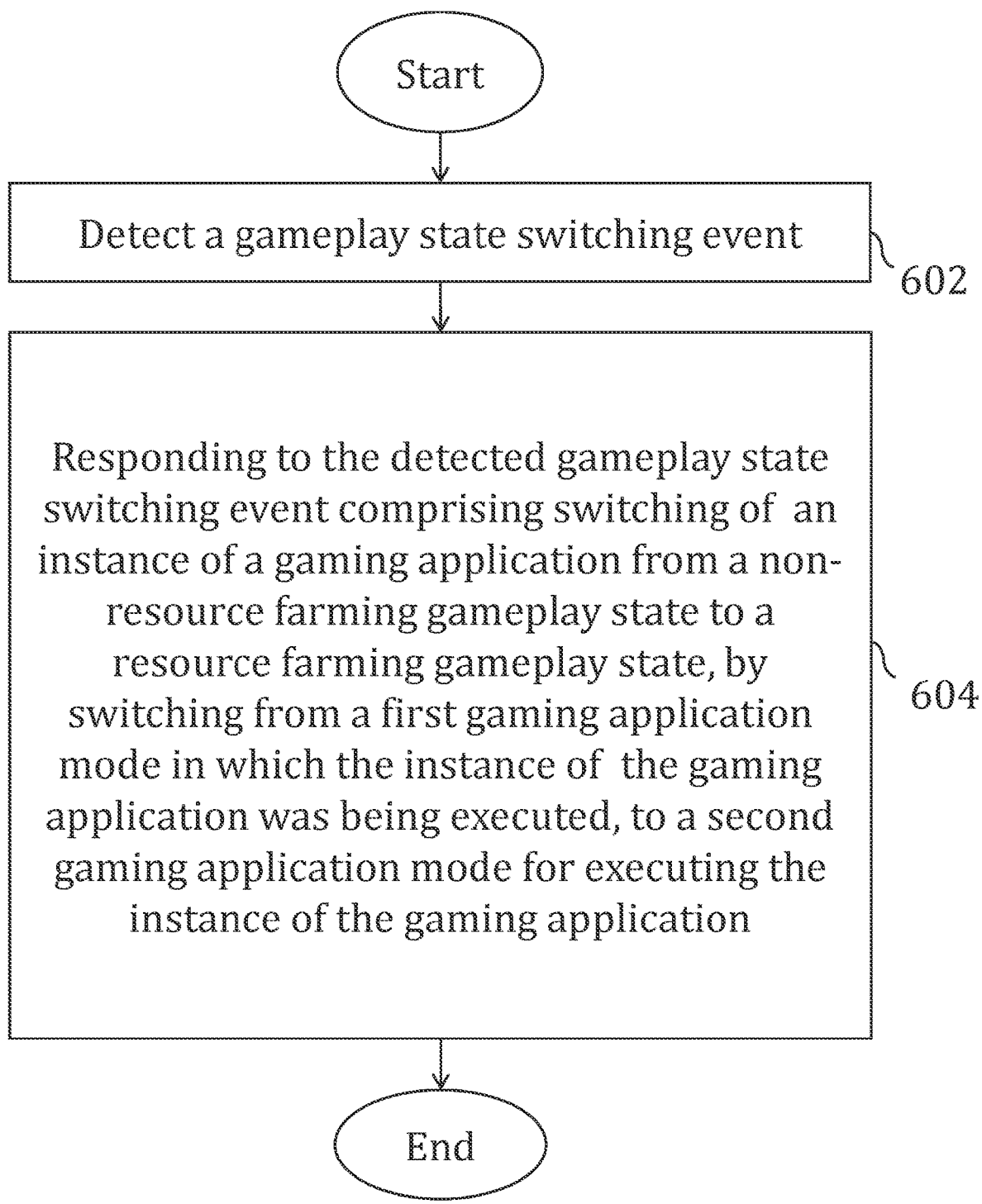
FIG. 6 is a flowchart illustrating a method of switching from a non-resource farming gameplay state to a resource farming gameplay state, in respect of an executing instance of a gaming application.

FIG. 6 is a flowchart illustrating a method of switching from a non-resource farming gameplay state to a resource farming gameplay state, in respect of an executing instance of a gaming application.

Step 602 comprises detecting a gameplay state switching event. In an embodiment, detecting a gameplay state switching event comprises detecting a gameplay change within the executing instance of the gaining application, wherein said gameplay has changed from any of a resource farming gameplay state, auto-play gameplay state, or inactive gameplay state, to any of a non-resource farming gameplay state or active gameplay state, in another embodiment, detecting a gameplay state switching event comprises detecting a gameplay change within the executing instance of the gaming application, wherein said gameplay has changed from any of a non-resource farming gameplay state or active gameplay state to any of a resource farming gameplay state, auto-play gameplay state, or inactive gameplay state.

The change in gameplay state at step 602 may be detected based on retrieved game settings, virtual machine environment settings, operating system settings, operating system emulator settings, and/or based on received gameplayer input(s). In more particular embodiments, rule-based or machine-learning based analysis of gameplay actions (for example specific gameplayer inputs or actions or selections) or outcomes (for example detected changes with respect to a particular configuration or gameplay state, viewing of a specific screen or map area, change in scene rendering, change in audio output etc.) within an instance of the gaming application can be used to detect and/or identify a gameplay state—for example, whether the gaming application is in a non-resource farming (i.e. active) gameplay state or in a resource farming gameplay state.

Step 604 comprises responding to a determination that the detected gameplay state switching event comprises switching of an executing instance of a gaming application from a non-resource farming gameplay state to a resource farming gameplay state, by switching from a first gaming application mode in which the instance of the gaming application was previously being executed, to a second gaming application mode for continuing with executing the instance of the gaming application. In an embodiment of the method, the first gaming application mode in which the instance of the gaming application was previously being executed comprises a non-resource farming gaming application mode, and the second gaming application mode for executing the instance of the gaming application comprises a resource farming gaming application mode.

Each of the resource farming gaming application mode and the non-resource farming gaming application mode comprises a discrete set of gaming application execution parameters—comprising one or more hardware parameters, operating system parameters, application software parameters, application runtime environment parameters and/or device driver parameters, that are capable of being implemented within a computing system in which the instance of the gaming application is being executed, for the purposes of executing the instance of the gaming application. In an embodiment of the method of FIG. 6, the resource farming gaming application is a more energy efficient and/or computing resource efficient mode than the non-resource farming gaming application mode. In another embodiment of the method of FIG. 6, the non-resource farming gaming application is a more energy intensive and/or computing resource intensive mode than the resource farming gaming application mode. In a more particular embodiment, a first set of gaming application execution parameters associated with the non-resource farming gaming application mode enables execution of an instance of a gaming application in a more energy intensive and/or computing resource intensive mode, when compared with a second set of gaming application execution parameters associated with the resource farming gaming application mode (which enable execution of an instance of a gaming application in a more energy efficient and/or computing resource efficient mode). In a further embodiment, the second set of gaming application execution parameters associated with the resource farming gaming application mode are selected to enable or effect implementation of one or more resource optimization techniques (for executing the instance of the gaming application) that are not implemented or enabled by the first set of gaming application execution parameters associated with the non-resource farming gaming application mode—including without limitation, one or more of vCPU allocation, CPU throttling, frame rate throttling, RAM reclaim, graphics scaling, GPU switching, audio scaling and/or audio muting.

Figure 7:
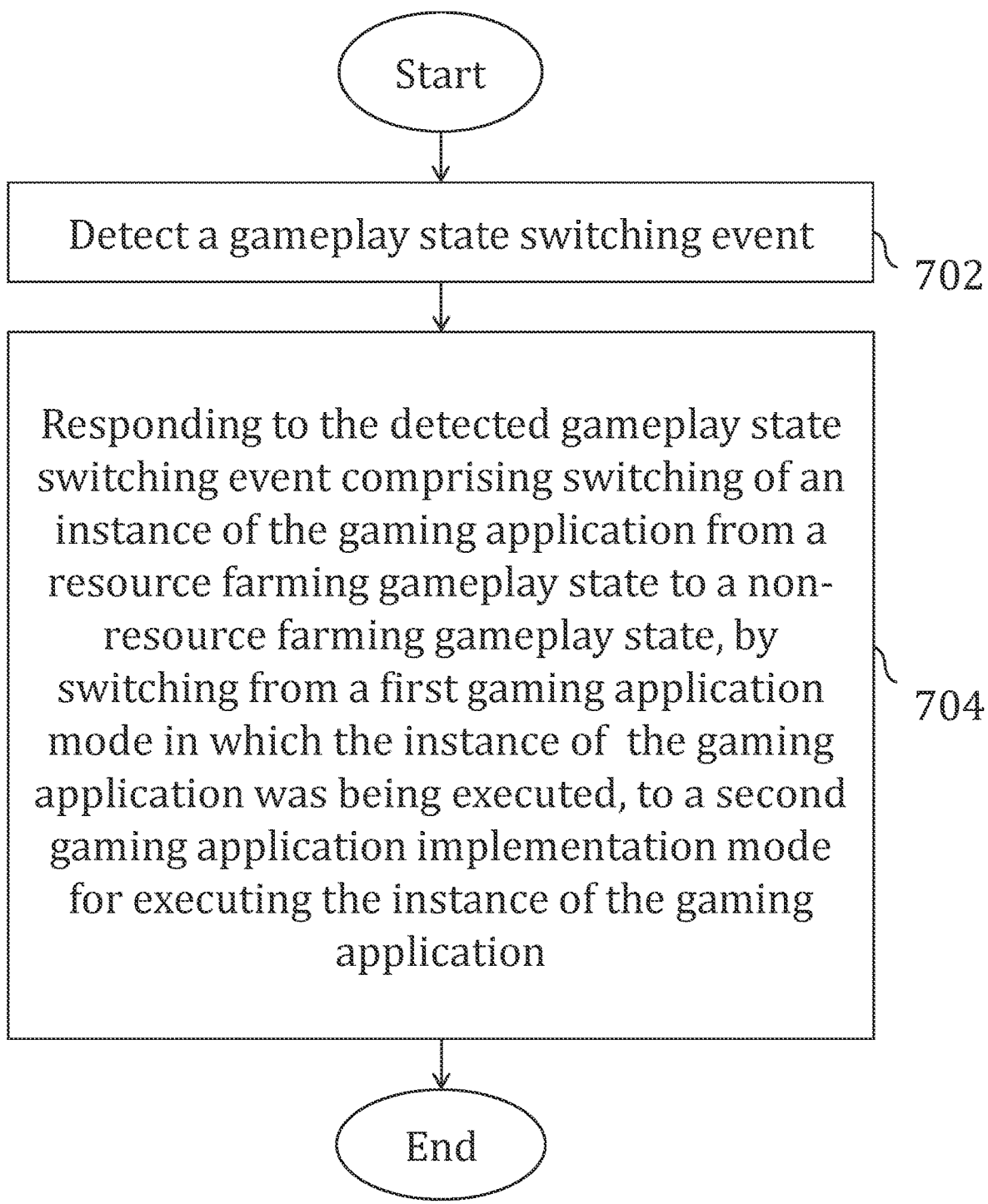
FIG. 7 is a flowchart illustrating a method of switching from a resource farming gameplay state to a non-resource farming gameplay state, in respect of an executing instance of a gaining application.

FIG. 7 is a flowchart illustrating a method of switching from a resource farming gameplay state to a non-resource farming gameplay state, in respect of an executing instance of a gaming application.

Step 702 comprises detecting a gameplay state switching event. In an embodiment, detecting a gameplay state switching event comprises detecting a gameplay state change within the executing instance of the gaming application, wherein said gameplay state has changed from any of a resource farming gameplay state or active gameplay state, to a non-resource firming gameplay state, auto-play gameplay state, or inactive gameplay state. In another embodiment, detecting a gameplay state switching event comprises detecting a gameplay state change within the instance of the gaming application under execution, wherein said gameplay has changed from any of a non-resource farming gameplay state or active gameplay state to any of a resource farming gameplay state, auto-play gameplay state, or inactive gameplay state.

The change in gameplay state at step 702 may be detected based on retrieved game settings, virtual machine environment settings, operating system settings, operating system emulator settings, and/or based on received gameplayer input(s). In more particular embodiments, rule-based or machine-learning based analysis of gameplay actions (for example specific gameplayer inputs or actions or selections) or outcomes (for example detected changes with respect to a particular configuration or gameplay state, viewing of a specific screen or map area, change in scene rendering, change in audio output etc.) within an instance of the gaming application can be used to detect and/or identity a gameplay state change—for example, whether the gaming application has changed from a non-resource farming (or active) gameplay state to a resource farming (or inactive) gameplay state or vice versa.

Step 704 comprises responding to the detected gameplay state switching event comprising switching of an instance of a gaming application from a resource farming gameplay state to a non-resource farming gameplay state, by switching from a first gaming application mode in which the instance of the gaming application was being executed, to a second gaming application mode for executing the instance of the gaming application. In an embodiment of the method, the first gaming application mode in which the instance of the gaming application was being executed comprises a resource farming gaming application mode, and the second gaming application mode for executing the instance of the gaming application comprises a non-resource farming gaming application mode.

Each of the resource farming gaming application mode and the non-resource farming gaming application mode comprises a discrete set of gaming application execution parameters comprising one or more hardware parameters, operating system parameters, application software parameters, application runtime environment parameters and/or device driver parameters, that are capable of being implemented within a computing system in which the instance of the gaming application is being executed, for the purposes of executing the instance of such instance of the gaming application. In an embodiment of the method of FIG. 7, the resource farming gaming application mode is a more energy efficient, and/or computing resource efficient mode than the non-resource farming gaming application mode. In another embodiment of the method of FIG. 7, the non-resource farming gaming application mode is a more energy intensive and/or computing resource intensive mode than the resource farming gaming application mode. In a more particular embodiment, a first set of gaming application execution parameters associated with the resource farming gaming application mode enable execution of an instance of a gaming application in a more energy efficient and/or computing resource efficient mode, when compared with a second set of gaming application execution parameters associated with the non-resource farming gaming application mode (which enable execution of an instance of a gaming application in a more energy intensive and/or computing resource intensive mode). In a further embodiment, the first set of gaming application execution parameters associated with the resource farming gaming application mode are selected to enable or effect implementation of one or more resource optimization techniques (for executing the instance of the gaming application) that are not implemented or enabled by the second set of gaming application execution parameters associated with the non-resource farming gaming application mode—which resource optimization techniques include without limitation, one or more of vCPU allocation, CPU throttling, frame rate throttling, RAM reclaim, graphics scaling, GPU switching, audio scaling and/or audio muting.

It has additionally been discovered that that the actual resource utilization optimization that can be achieved by selecting a resource farming gaming application mode (for executing an instance of a gaming application on a computing device), or by switching from a non-resource farming gaming application mode to a resource farming gaming application mode is dependent on whether a gameplayer (or the applicable game settings, or the virtual machine environment/operating system emulator settings corresponding to an instance of a gaming application) (i) requires the capability to switch between a resource farming gaming application mode and a non-resource farming gaming application gaming application mode without having to restart the instance of the gaming application or having to restart a virtual machine environment/operating system emulator within which the instance of the gaming application is being executed, or (ii) alternately does not require the capability to switch between a resource farming gaming application mode and a non-resource farming gaming application gaming application mode without having to restart the instance of the gaming application or having to restart a virtual machine environment/operating system emulator within which the instance of the gaming application is being executed.

More specifically, in the event a gameplayer (or the applicable game settings, or the virtual machine environment/operating system emulator settings corresponding to an instance of a gaming application) requires the capability to switch between a resource farming gaming application mode and a non-resource farming gaming application mode without having to restart the instance of the gaming application or having to restart a virtual machine environment/operating system emulator within which the instance of the gaming application is being executed—the degree of resource utilization optimization that can be achieved is lower than for instances where this capability is not required. This is for the reason that switching between modes without having to restart the instance of the gaming application/the virtual machine environment/operating system emulator, requires storage and subsequent retrieval of sufficient game information or gameplay context information defining one or more gameplay states associated with the instance of the gaming application that is under execution—for enabling switching from an resource utilization optimization mode to a non-optimized or less optimized mode of resource utilization.

Accordingly, the specific resource optimization techniques that are implemented for executing an instance of a gaming application in a resource farming gaming application mode may in certain embodiments be selected based on a determination whether or not a gameplayer (or the applicable game settings, or the virtual machine environment/operating system emulator settings corresponding to an instance of a gaming application) requires the capability to switch between a resource farming gaming application mode and a non-resource farming gaming application mode without having to restart the instance of the gaming application or having to restart a virtual machine environment/operating system emulator within which the instance of the gaming application is being executed. In the event the capability for switching between modes without restarting the instance of the gaming application/the virtual machine environment/operating system emulator is required, a first set of resource optimization techniques may be implemented. In the event that the capability for switching between modes without restarting the instance of the gaming application/the virtual machine environment/operating system emulator is not required, a second set of resource optimization techniques may be implemented. The first set of resource optimization techniques FIG. 8 is a flowchart illustrating a specific method of selecting a set of resource optimization techniques for implementing a resource farming gaming application mode—based on identifying whether an executing instance of a gaming application requires or incorporates the capability to switch between a resource farming gaming application mode and a non-resource farming without restarting the instance of the gaming application.

Step 802 comprises determining whether an executing instance of a gaming application requires or incorporates a capability to switch between a resource farming gaming application mode and a non-resource farming gaming application mode without restarting the instance of the gaming application (or without having to restart a virtual machine environment/operating system emulator within which the instance of the gaming application is being executed).

Step 804 comprises selecting a set of resource optimization techniques for implementing a resource farming gaming application mode, wherein selection of the set of resource optimization techniques is based on the determination at the step 802 (i.e. on whether the instance of a gaming application requires or incorporates a capability to switch between a resource farming gaming application mode and a non-resource farming gaming application mode without restarting the instance of the gaming application or without having to restart a virtual machine environment/operating system emulator).

Figure 8:
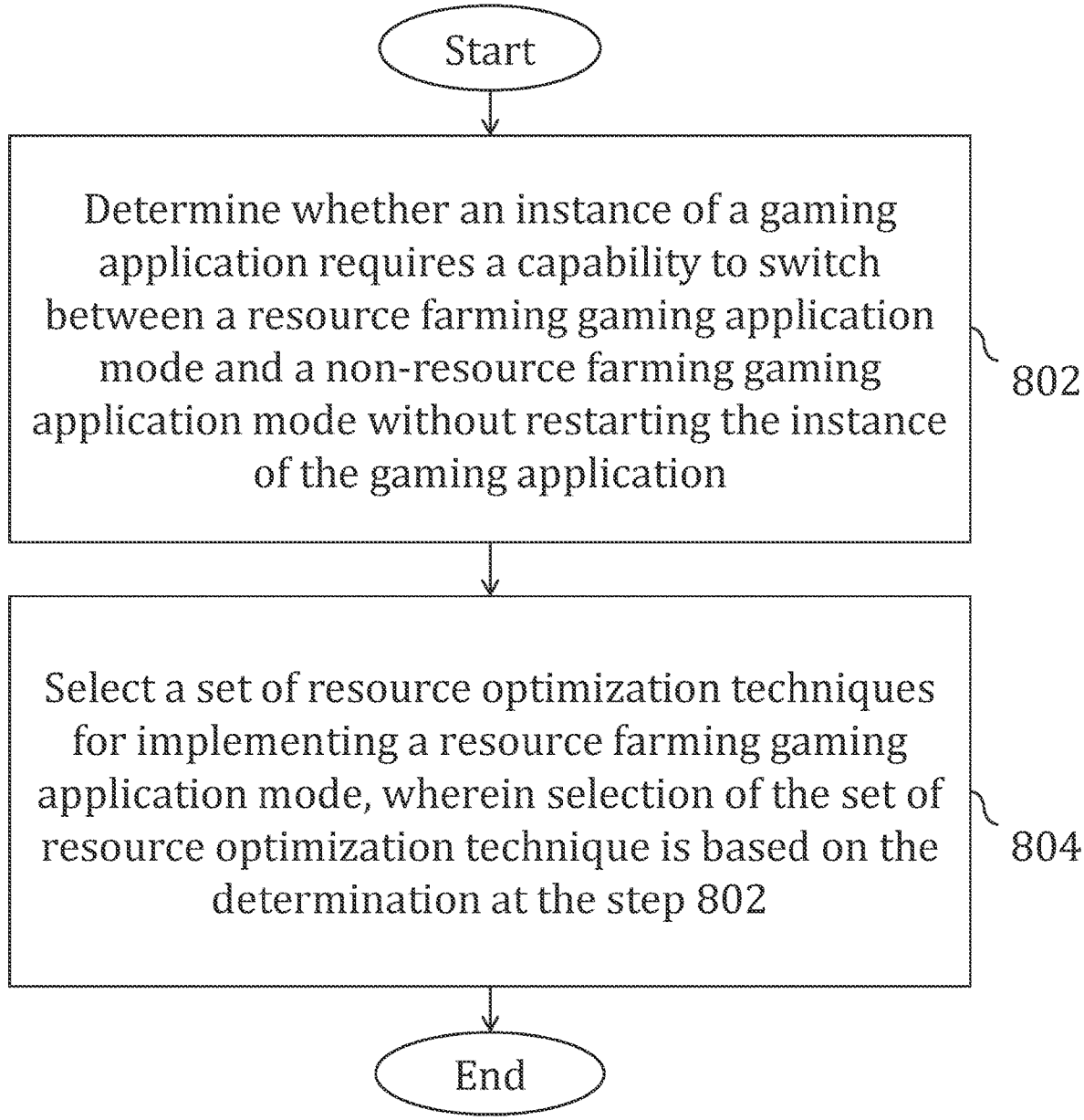
FIG. 8 is a flowchart illustrating a method of selecting a set of resource optimization techniques for implementing a resource farming gaining application mode.

In an embodiment of the method of FIG. 8, in the event a gameplayer (or the applicable game settings, or the virtual machine environment/operating system emulator settings corresponding to an instance of a gaming application) requires the capability to switch between a resource farming gaming application mode and a non-resource farming gaming application mode without having to restart the instance of the gaming application or without having to restart a virtual machine environment/operating system emulator within which the instance of the gaming application is being executed—a corresponding first set of resource optimization techniques are selected at step 804, which would enable a degree of resource utilization optimization that is lower than the degree of resource utilization optimization that would be enabled by a second set of resource optimization techniques that are selectable at step 804 in instances where this capability is not required.

In an embodiment, the second set of resource optimization techniques may implement one or more resource optimization techniques (for executing the instance of the gaming application) that are not implemented within the first set of resource optimization techniques.

One or both of the first and second set of resource optimization techniques may include any one or more of vCPU allocation, CPU throttling, frame rate throttling, RAM reclaim, graphics scaling, GPU switching, audio scaling and/or audio muting.

In another embodiment, the second set of resource optimization techniques may implement one or more of the same resource optimization techniques (for executing the instance of the gaming application) that are implemented within the first set of resource optimization techniques—but with different resource optimization parameters or settings.

In an embodiment of the invention, the computing device is configured to select either one of a first and second set of resource optimization techniques for implementing a resource farming gaming application mode for executing an instance of a gaming application, wherein the selection from among the first and second set of resource optimization techniques is based on a determination whether or not a gameplayer (or the applicable game settings, or the virtual machine environment/operating system emulator settings corresponding to an instance of a gaming application) requires the capability to switch between a resource farming gaming application mode and a non-farming gaming application mode without having to restart the instance of the gaming application or without having to restart a virtual machine environment/operating system emulator within which the instance of the gaming application is being executed. In particular embodiments, this determination may be based on retrieved game settings/virtual machine environment settings/operating system emulator settings, or alternatively based on received gameplayer input(s).

It has been discovered that resource optimization techniques that are applied for implementing a resource farming gaming application mode for executing an instance of a gaming application can vary based on the specific gaming application—since different games may respond differently to the same resource optimization technique (for example, as a consequence of different internal gaming and/or coding mechanics). It has additionally been found that gaming applications that are implemented based on the same or similar gaming engines are likely to respond similarly to the same resource optimization technique, as a consequence of implementing similar internal gaming and/or coding mechanics.

In an embodiment of the invention, a sub-set of resource optimization techniques may be selected from a larger set of resource optimization techniques, for the purpose of implementing a resource farming gaming application mode for executing an instance of a gaming application—wherein the sub-set of resource optimization techniques may be selected based on a pre-defined set of selection rules, or based on one or more gameplayer inputs, DevOps inputs or SysAd inputs, or based on a combination of rule based and input based selection.

In an embodiment of the invention, one or more of the following may be implemented for the purposes of selecting and applying resource optimization techniques for implementing a resource farming gaming application mode for executing an instance of a gaming application:

responsive to detecting that a gaming application creates threads with specific thread names, it can be determined that the gaming application implements an independent audio loop—which independent audio loop can be identified (for example, based on thread name or thread name characteristics) and throttled or muted for the purposes of implementing a resource farming gaming application mode responsive to identifying a particular sequence of application program interface (API) calls in a specific process thread—which sequence of API calls are associated with graphics threads within a gaming engine but not with physics threads within the gaming engine, it can be determined that the specific process thread is a graphics thread—and the frame rate of an instance of a gaming application that has generated this thread can be throttled without adversely affecting an internal state of gameplay of the game responsive to identifying a particular sequence of API calls in a specific process thread, it can be determined whether the gaming application is drawing full scenes at periodic intervals, or alternatively whether certain scenes are only drawn once. In case the gaming application is drawing full scenes at periodic intervals, frame data can be downscaled or discarded entirely without needing to save it to enable a subsequent return to a non-resource farming gaming application mode for the game. In case the gaming application draws one or more scenes only once, downscaling or discarding of frame data will need to be accompanied by saving of such frame data to enable a subsequent return to a non-resource farming gaming application mode for the game.

responsive to identifying a particular sequence of API calls from an instance of a gaming application, it can be determined whether only a sub-set of API calls can be GPU cached or whether all API calls can be sent to the GPU cache responsive to analysis of the gaming application characteristics at install time, an additional determination may be made regarding whether the gaming application data pre-bundles lower quality/lower resolution data assets that can be rendered or called in a resource farming gaming application mode responsive to an instance of a gaming application being implemented in a resource farming gaming application mode, the type or number or periodicity of queries to the operating system for available vCPU's and RAM resources may be lower than when the gaming application is implemented in a non-resource farming gaming application mode In an embodiment of the invention, a computing device that is configured to implement one or more methods as described above, may be configured to respond to a determination that:

an instance of a gaming application is in a resource farming gameplay state, by switching from a first gaming application gaming application mode in which the instance of the gaming application was being executed, to a second gaming application gaming application mode for executing of the instance of the gaming application—wherein the second gaming application gaming application mode is a resource farming gaming application mode and is a more energy and/or computing resource efficient mode than the first gaming application gaming application mode. In an embodiment, the second gaming application gaming application mode may implement one or more resource optimization techniques (for executing the instance of the gaming application) that are not implemented within the first gaming application mode—including without limitation, one or more of vCPU allocation, CPU throttling, frame rate throttling, RAM reclaim, graphics scaling, GPU switching, audio scaling and/or audio muting an instance of a gaming application has switched from a non-resource farming gameplay state to a resource farming gameplay state, by switching from a first gaming application mode in which the instance of the gaming application was being executed in the non-resource farming gameplay state, to a second gaming application mode for executing the instance of the gaming application—wherein the second gaming application mode is a resource farming gaming application mode and is a more energy and/or computing resource efficient mode than the first gaming application mode. In an embodiment, the second gaming application mode may implement one or more resource optimization techniques (for executing the instance of the gaming application) that are not implemented within the first gaming application mode—including without limitation, vCPU allocation, CPU throttling, frame rate throttling, RAM reclaim, graphics scaling, GPU switching, audio scaling and/or audio muting an instance of a gaming application has switched from a resource farming gameplay state to a non-resource farming gameplay state, by switching from a first gaming application mode in which the instance of the gaming application was being executed in the resource farming gameplay state, to a second gaming application mode for executing the instance of the gaming application—wherein the first gaming application mode is a resource farming gaming application mode and is a more energy and/or computing resource efficient mode than the second gaming application mode. In an embodiment, the first gaming application mode may implement one or more resource optimization techniques (for executing the instance of the gaming application) that are not implemented within the second gaming application mode—including without limitation, vCPU allocation, CPU throttling, frame rate throttling, RAM reclaim, graphics scaling, GPU switching, audio scaling and/or audio muting.

an instance of a gaming application has switched from a resource farming gameplay state to a non-resource farming gameplay state, by switching from a first gaming application mode in which the instance of the gaming application was being executed in the resource farming gameplay state, to a second gaming application mode for executing of the instance of the gaming application—wherein the first gaming application mode is a resource farming mode and is a more energy and/or computing resource efficient mode than the second gaming application mode, and where the second gaming application mode involves allocation of hardware or processing resource to the instance of the gaming application according to default execution settings of the gaming application (or specific instance of the gaming application). In an embodiment, the first gaming application mode may implement one or more resource optimization techniques (for executing the instance of the gaming application) that are not implemented within the second gaming application mode—including without limitation, vCPU allocation, CPU throttling, frame rate throttling, RAM reclaim, graphics scaling, GPU switching, audio scaling and/or audio muting.

Figure 9:
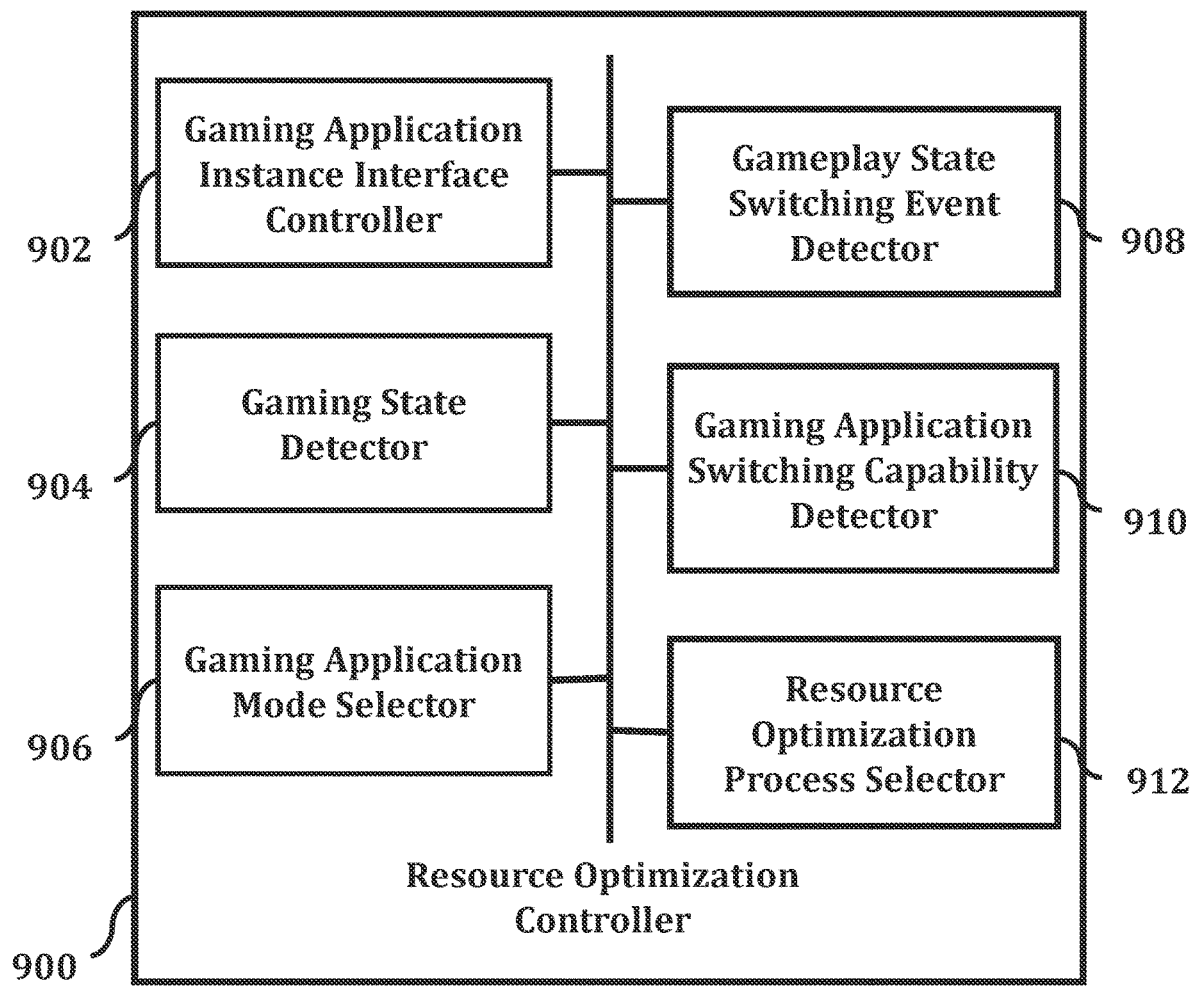
FIG. 9 illustrates a resource optimization controller configured in accordance with the teachings of the present invention.

FIG. 9 illustrates a resource optimization controller 900 configured in accordance with the teachings of the present invention. In particular embodiments, the resource optimization controller 900 may comprise one of the resource optimization controllers shown in FIGS. 2 and 9 respectively. In certain embodiments, resource optimization controller 900 may be configured to implement one or more of the methods or method steps discussed in connection with FIGS. 3 to 8 respectively. Resource optimization controller 900 may include one or more of a gaming application instance interface controller 902, a gaming state detector 904, a gaming application mode selector 906, a gameplay state switching event detector 908, a gaming application switching capability detector 910 and a resource optimization process selector 912.

Gaming application instance interface controller 902 is a processor implemented controller that enables resource optimization controller 902 to identify, detect, monitor, track and/or communicate with each instance of a gaming application that is under execution within a computing system.

Gaming state detector 904 is a processor implemented detector that is configured to detect gameplay states associated with an instance(s) of gaming applications that is under execution. In an embodiment, gaming state detector 904 is configured to implement any of steps 302, 402 or 502 of FIGS. 3 to 5 respectively.

Gaming application mode selector 906 is a processor implemented selector that is configured to select and implement a gaming application mode from among a plurality of gaming application modes, in accordance with any of steps 304 to 306, 404 to 406, 504 to 506, 604 or 704 of FIGS. 3 to 7 respectively.

Gameplay state switching event detector 908 comprises a processor implemented detector configured to detect instances of gameplay state switching events as described in connection with steps 602 or 702 of FIGS. 6 and 7 respectively.

Gaming application switching capability detector 910 comprises a processor implemented detector configured to detect whether an instance of a gaming application that is under execution requires or incorporates the capability to switch between a resource farming gaming application mode and a non-resource farming gaming application mode without having to restart the instance of the gaming application, or having to restart a virtual machine environment/operating system emulator within which the instance of the gaming application is being executed. In an embodiment, gaming application switching capability detector 910 is configured to implement step 802 of the method as described in connection with FIG. 8.

Resource optimization process selector 912 is a processor implemented selector configured to select and implement a set of resource optimization techniques for implementing a resource gaming application mode in accordance with various methods of the present invention. In an embodiment, resource optimization process selector 912 is configured to implement step 804 of the method of FIG. 8.

Figure 10:
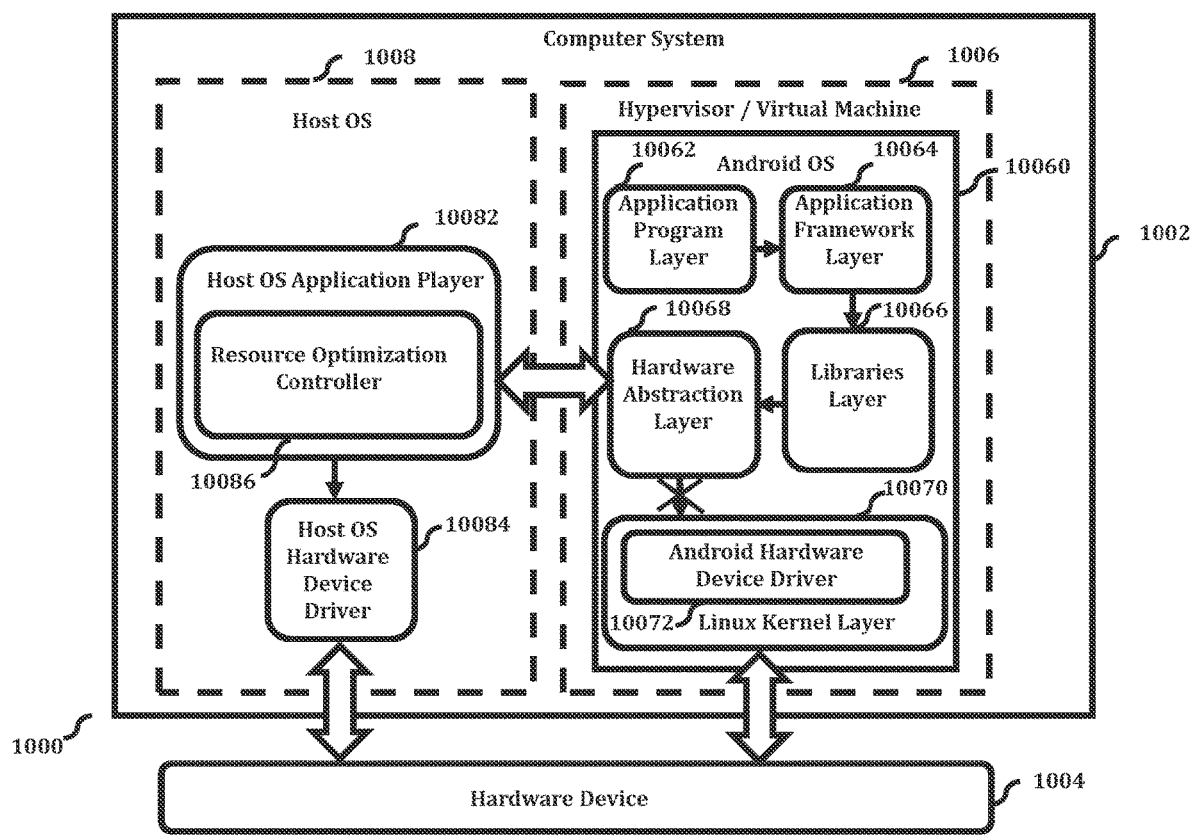
FIG. 10 illustrates a specific configuration of a resource optimization controller that is implemented within a computer implemented architecture configured for execution of application software configured for a guest operating system within a host operating system.

FIG. 10 illustrates a specific configuration of a resource optimization controller that is implemented within a computer implemented architecture configured for execution of application software configured for a guest operating system within a host operating system.

Figure 2:
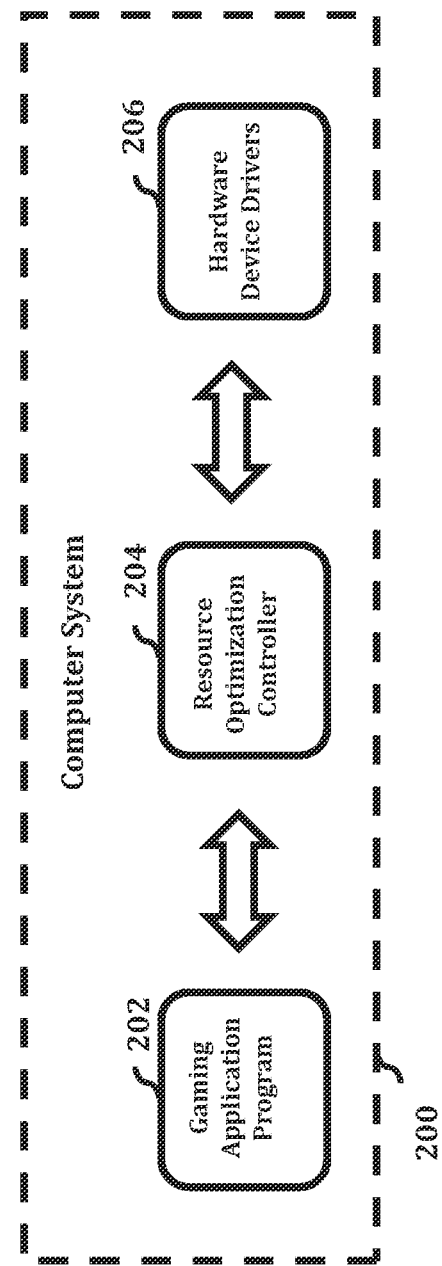
FIG. 2 illustrates an embodiment of a computing system that can be used for optimizing computer system resource utilization within instances of one or more gaming applications that are under execution, during in-game resource farming.

As in the case of FIG. 2, FIG. 10 illustrates a computer system architecture configured for enabling execution of a software program (for example a virtual machine program) written for a guest operating system 10060, within a host operating system 1008 implemented on the computer system 1000. The computer system architecture includes a guest operating system architecture 10060 (in this example Android architecture) and a host operating system architecture 1008 (for example a Windows/OS X architecture).

The guest OS architecture/Android architecture 10060 depicted in FIG. 10 represents a virtual operating system that is launched by executing a host OS software application 1006 configured to emulate a hardware architecture capable of implementing the guest OS 10060—which host OS software application 1006 may be referred to as virtual software or a hypervisor. Executing the hypervisor 1006 creates an instance of a virtual machine on which the guest operating system 10060, e.g., the Android OS, can be run in a manner that is transparent to the end user. The guest OS/Android OS 10060 may include a software stack including one or more of an application program layer 10062, an application framework layer 10064, a libraries layer 10066, a hardware abstraction layer (HAL) 10068, and a kernel layer 10070. The applications layer 10062 includes various software applications. The application framework layer 10064 is used by developers to access framework application programming interfaces (APIs) and manage the basic functions of a mobile device, laptop, or tablet on which Android is executed, such as resource allocation, switching between processes or programs, phone applications, and keeping track of the physical location of the phone/laptop/tablet. The application framework layer 10064 may include various managers, including an activity manager, a window manager, a content provider manager, a view system manager, a package manager, a telephony manager, a resource manager, a location manager, and a notification manager.

The libraries layer 10066 includes libraries written, e.g., in C, C++, etc., and is used by various systems. The libraries instruct the device executing Android how to handle different kinds of data and are exposed to Android developers via the application framework. Libraries may include, e.g., a surface manager, a media framework library, an SQLite library, an Open GL/ES library, a Free Type library, a WebKit library, an SGL library, an SSL library, and an libc library.

The hardware abstraction layer 10068 provides a standard way to create software hooks (code used to alter or augment the behavior of an operating system, of applications, or of other software components by intercepting function calls or messages or events passed between software components) between the Android platform stack and the underlying hardware. The hardware abstraction layer 10068 also acts as an abstraction layer between the hardware and the rest of the software stack.

The Linux kernel layer 10070 includes Android memory management programs, security settings, power management software and several drivers, such as the device driver for hardware, file system access, networking, and inter-process-communication.

Ordinarily, an instruction from an Android OS software application to a hardware device (for example an audio or display device) would be routed to a hardware device driver in the corresponding kernel—which driver would thereafter control the operation of the hardware device based on the received instruction. However, since in the illustration shown in FIG. 10, the Android OS 10060 is launched from within the host OS 1008, the Android OS 10060 would be run within the host OS 1008 as a process or a plurality of processes. Any attempt by an Android application to access the hardware through the Linux drivers in such a device would be meaningless to the host OS 1008, because such access is outside of the scope of the host OS 1008. Thus, a request for data or an instruction from an Android application would not be sent from the HAL 10068 to the Linux kernel 10070 (as shown by the crossed out communication link in FIG. 10), since Linux kernel hardware device drivers 10072 would be unable to fulfil the request or instruction—which would in turn result in an unintended state or malfunctioning of the hardware.

Instead, such request or instruction would be routed to a host OS application player 10082 via one or more of the application framework layer 10064, the libraries layer 10066, the HAL 10068 and a data channel between the HAL 10068 and the host OS application player 10082—the data channel being configured to enable a request or instruction from an Android application to be relayed to the host OS application player 10082.

The host OS application player 10082 is an application associated with the host OS 1008, which is executed by the host OS processor in a user mode layer associated with the host OS (e.g. Windows OS/OS X). Through the host OS application player 10068, applications of the guest operating system/Android operating system 10060 are able to access the host OS hardware device driver(s) 10084, and through said host OS hardware device driver(s) 10084, the hardware and system data of host OS 1008.

Additionally, in the computer system illustrated in FIG. 10, a resource optimization controller 10086 is implemented within the computer system 1000 and is configured for execution of application software configured for the guest operating system 10060 within the host operating system 1008. In the embodiment of FIG. 10, the resource optimization controller 10086 is implemented within the Host OS Application Player 10082 that is installed within the Host OS 1008—and is therefore positioned to receive function calls or messages or events passed from an executed instance of the gaming application (that is being executed within the virtual machine 1006 stack) to the Host OS hardware device drivers 10084 and onward to the underlying hardware 1004. Resource optimization controller 10086 within the Host OS Application Player 10082 may be configured to implement any one or more (and preferably all) of the above described methods and features of the invention, including without limitation, methods for (i) executing an instance of a gaming application in resource farming gaming application mode, (ii) switching from a non-resource farming gaming application mode to a resource farming gaming application mode for executing an instance of a gaming application, (iii) switching from a resource farming gaming application mode to a non-resource farming gaming application mode for executing an instance of a gaming application, (iv) resource optimization for reducing computing resource consumption during implementing of an instance of a gaming application, (v) determining whether an instance of a gaming application is in a resource farming gameplay state or a non-farming gameplay state, (vi) selection of resource optimization techniques based on an identified requirement for the capability to switch between a resource farming gaming application mode and a non-resource farming gaming application gaming application mode without having to restart the instance of the gaming application or having to restart a virtual machine environment/operating system emulator within which the instance of the gaming application is being executed, and (vii) rule based and/or input based selection of resource optimization techniques for implementing resource farming gaming application mode for an executed instance of a gaming application.

In certain embodiments of the invention, a computing device, or a processor, or a processor implemented host OS application player is configured to enable the computing device to simultaneously run multiple gaming application softwares, and further to simultaneously run multiple instances of one or more of the simultaneously running multiple gaming application software programs. It would be understood that the computing device, or the processor, or the processor implemented host OS application player, may be configured such that each instance of each simultaneously running gaming application software programs is executed within a corresponding distinct virtual machine environment implemented within the computing device—which virtual machine environment may be dedicated to enabling execution of the specific instance of the gaming application software program, within the host OS.

Figure 11:
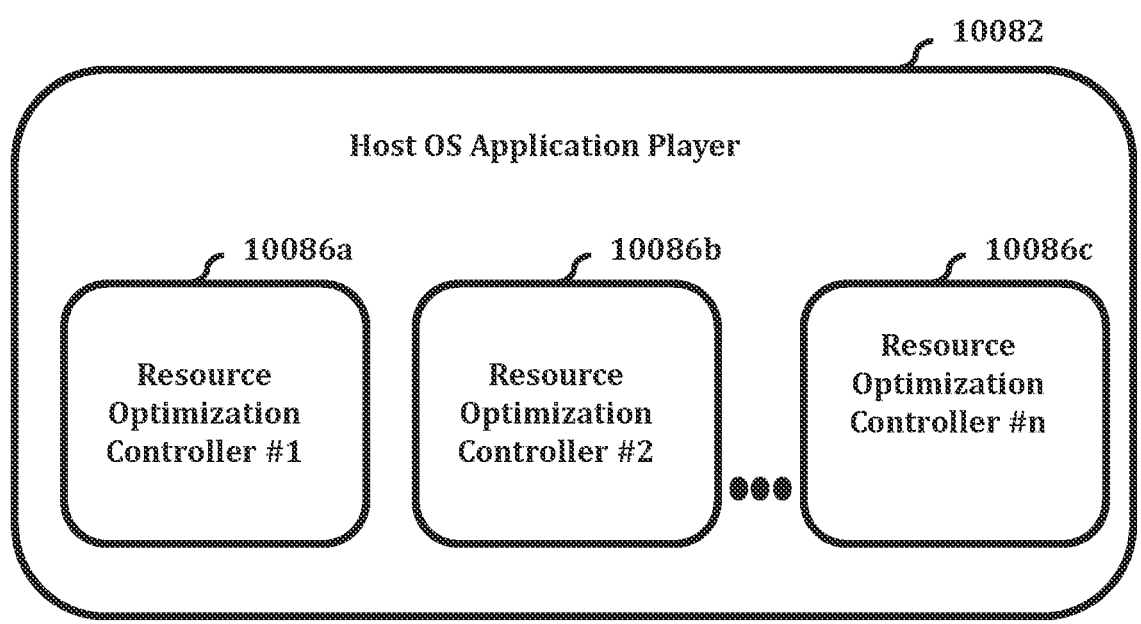
FIG. 11 illustrates a Host OS Application Player configured to implement a plurality of resource optimization controllers therewithin.

As a result, in an embodiment of the invention that is illustrated in FIG. 11, a host OS application player 10082 may include a plurality of resource optimization controllers 10086a, 10086b, 10086c (i.e. resource optimization controller #1, resource optimization controller #2, upto resource optimization controller #n)—such that each resource optimization controller 10086a, 10086b, 10086c may be respectively assigned for resource optimization control of a single instance of a gaming application software program that is under execution. In an embodiment where the host OS application player 10082 has been configured such that each instance of each simultaneously running gaming application software program is executed within a corresponding distinct virtual machine environment implemented within the computing device, each of the distinct virtual machine environments may have a corresponding distinct resource optimization controller 10086a, 10086b, 10086c assigned thereto.

In a particular embodiment of the invention, the host OS application player 10082 may be configured to enable simultaneous implementation of multiple different guest operating systems—each of the multiple different guest operating systems being implemented within a corresponding distinct virtual machine implemented and controlled by the host OS application player 10082. In a more particular embodiment, the host OS application player 10082 is configured such that each instance of the multiple different guest operating systems is executed within a corresponding distinct virtual machine environment implemented within the computing device, and each of the distinct virtual machine environments has a corresponding distinct resource optimization controller 10086a, 10086b, 10086c assigned thereto. The simultaneously implemented different guest operating systems may comprise a plurality of different operating systems, or may comprise a plurality of different versions of the same operating system. As a consequence of generating multiple virtual machines, and each virtual machine implementing a different guest operating system or a different version of a guest operating system, the host OS application player 10082 enables simultaneous execution of a plurality of different gaining application softwares, each of which may require a different guest operating system or a different version of a guest operating system. As a result, a user can initiate and simultaneously play multiple different games on a single computing device, despite each of these multiple games requiring to be executed within a different operating system or within different versions of the same operating system. Each resource optimization controller 10086a, 10086b, 10086c assigned to a corresponding instance of a gaming application software being executed within the computing device may be configured in accordance with any of the methods and functionality for resource optimization controllers that has been described above.

Since the invention is configured to enable a user to initiate multiple instances of a gaming software application within multiple instances of a virtual machine environment, a user is enabled to execute within a single computing device, multiple instances of each of a plurality of different games—wherein each of the plurality of different games can be implemented or run within a different guest operating system or a different version of a guest operating system for execution of the game.

As discussed above, the invention enables functionality wherein each executing instance of one or more gaining application softwares can be run in either resource farming mode or in non-resource farming mode, and additionally can be switched from one of resource farming mode and non-resource farming mode, to the other of the two modes. However, it would be understood that the functionality that the host OS application player 10082 requires for implementing resource farming mode, or for switching between one of resource farming mode and non-resource farming mode and the other of the two modes, would differ significantly within each different guest operating system or within each different version of a guest operating system.

FIG. 12 illustrates a method that addresses this problem. As shown in FIG. 12, the method comprises the steps of (i) detecting (at step 1202 of FIG. 12) a gameplay instruction or gameplay event that has been defined as a trigger for implementing a resource farming mode, or for switching from a resource farming mode to a non-resource farming mode, or for switching from a non-resource farming mode to a resource farming mode, in connection with an instance of a gaming application software that is under execution (i.e. a runtime instance of the gaming application software), (ii) identifying (at step 1204 of FIG. 12) the guest operating system and/or a version of the guest operating system within which the instance of the gaming application software is being executed within a corresponding virtual machine within the computing device, and (iii) selecting (at step 1206 of FIG. 12) from among a plurality of resource farming mode implementation protocols or from among a plurality of mode switching protocols, a resource farming mode implementation protocol or a mode switching protocol that is implementable within the identified guest operating system or that is implementable within the identified version of the guest operating system, and (iv) implementing (at step 1208 of FIG. 12) within the runtime instance of the selected resource farming mode implementation protocol or the mode switching protocol to switch from a resource farming mode to a non-resource farming mode or to switch from a non-resource farming mode to a resource farming mode.

In an embodiment of the method of FIG. 12 (i) the selected resource farming mode implementation protocol or the selected mode switching protocol is implementable within and/or compatible with the identified guest operating system, and (ii) one or more of the remaining resource farming mode implementation protocols within the plurality of resource farming mode implementation protocols, or one or more of the remaining mode switching protocols within the plurality of mode switching protocols are unimplementable within and/or are incompatible with the identified guest operating system.

In an embodiment, the method of FIG. 12 may be implemented at or within host OS application player 10082, or at or within a resource optimization controller 10086a, 10086b, 10086c within host OS application player 10082.

In an embodiment of the method of FIG. 12, each of the plurality of resource farming mode implementation protocols or each of the plurality of mode switching protocols is different from the others in respect of one or more computer implementable instructions. In a particular embodiment, each guest operating system, or each different version of a guest operating system that is capable of being hosted within the host OS application player, is mapped to one of the plurality of resource farming mode implementation protocols or to one of the plurality of mode switching protocols.

In a specific embodiment of the invention, the host OS application player 10082 may be configured to enable simultaneous execution of at least one instance (i.e. a first instance) of a first gaming application software and one instance (i.e. a second instance) of a second gaming application software, each respectively being executed within a distinct virtual machine implemented within the same computing device. In this embodiment, the first gaming application software is configured for execution within (and is executed within) a first guest operating system, while the second gaming application software is configured for execution within (and is executed within) a second guest operating system that is different from the first guest operating system. The first and second guest operating systems may be entirely different from each other, or may comprise different versions of the same operating system.

FIG. 13 illustrates a method of the present invention involving first and second guest operating systems that are either entirely different from each other, or that comprise different versions of the same operating system. As shown in in FIG. 13, the method comprises the steps of (i) detecting (at step 1302 of FIG. 13) a first gameplay instruction or gameplay event that has been defined as a trigger for implementing a first resource farming mode, or for switching from a first resource farming mode to a first non-resource farming mode, or for switching from a first non-resource farming mode to a first resource farming mode, in connection with a first instance of a first gaming application software, (ii) detecting (at step 1304 of FIG. 13) a second gameplay instruction or gameplay event that has been defined as a trigger for implementing a second resource farming mode, or for switching from a second resource farming mode to a second non-resource farming mode, or for switching from a second non-resource farming mode to a second resource farming mode, in connection with the second instance of the second gaming application software, (iii) identifying (at step 1306 of FIG. 13) the first guest operating system and/or the first version of the guest operating system within which the first instance of the first gaming application software is being executed within a corresponding first virtual machine within the computing device, (iv) identifying (at step 1308 of FIG. 13) the second guest operating system and/or the second version of the guest operating system within which the second instance of the second gaming application software is being executed within a corresponding second virtual machine within the computing device, iv) selecting (at step 1310) from among a plurality of resource farming mode implementation protocols or from among a plurality of mode switching protocols, a first resource farming mode implementation protocol or a first mode switching protocol associated with the identified first guest operating system or the identified first version of the guest operating system, and implementing (for the first instance of the first gaming application software) the first resource farming mode or the switch from the first resource farming mode to the first non-resource farming mode or from the first non-resource farming mode to the first resource farming mode, based on the selected first resource farming mode implementation protocol or the first mode switching protocol, and (vi) selecting (at step 1312 of FIG. 13) from among the plurality of resource farming mode implementation protocols or from among a plurality of mode switching protocols, a second resource farming mode implementation protocol or a second mode switching protocol associated with the identified second guest operating system or the identified second version of the guest operating system, and implementing (for the second instance of the second gaming application software) the second resource farming mode or the switch from the second resource farming mode to the second non-resource farming mode or from the second non-resource farming mode to the second resource farming mode, based on the selected second resource farming mode implementation protocol or the second mode switching protocol.

The first gaming application software and the second gaming application software may be identical to each other, or may be different from each other. Further, in the method of FIG. 13, both the first runtime instance of the first gaming application software and the second runtime instance of the second gaming application software are being implemented within the same computing device.

In an embodiment of the method of FIG. 13;
(i) the selected first resource farming mode implementation protocol or the selected first mode switching protocol is implementable within and/or compatible with the identified first guest operating system, and (ii) the selected second resource farming mode implementation protocol or the selected second mode switching protocol is implementable within and/or compatible with the identified second guest operating system, or (i) the selected first resource farming mode implementation protocol or the selected first mode switching protocol is implementable within and/or compatible with the identified first guest operating system, and is unimplementable within and/or incompatible with the identified second guest operating system (ii) the selected second resource farming mode implementation protocol or the selected second mode switching protocol is implementable within and/or compatible with the identified second guest operating system, and is unimplementable within and/or incompatible with the identified first guest operating system.

In an embodiment, the method of FIG. 13 may be implemented at or within host OS application player 10082. In a further embodiment, the method of FIG. 13 may be implemented at least partially through a first resource optimization controller 10086a, 10086b, 10086c and a second resource optimization controller 10086a, 10086b, 10086c, wherein the first resource optimization controller 10086a, 10086b, 10086c is configured to implement at least step 1310 of the method of FIG. 13, and the second resource optimization controller 10086a, 10086b, 10086c is configured to implement at least step 1312 of the method of FIG. 13.

In embodiments of the method of FIG. 13, the selected first resource farming mode implementation protocol or a first mode switching protocol is different from the selected second resource farming mode implementation protocol or a second mode switching protocol associated with the identified second guest operating system or the identified second version of the guest operating system—in respect of one or more implementable instructions or protocol steps or requirements. In a particular embodiment (i) the first guest operating system or the first version of the guest operating system is mapped to the first resource farming mode implementation protocol or the first mode switching protocol, and (ii) the second guest operating system or the second version of the guest operating system is mapped to the second resource farming mode implementation protocol or the second mode switching protocol.

For the purposes of the methods of FIGS. 12 and 13, it would be understood that each resource farming mode implementation protocol (among the plurality of resource farming mode implementation protocols) may comprise a set of computer implementable instructions for implementing a resource farming mode within a runtime instance of a gaming application software that is under execution. Likewise, for the purposes of the methods of FIGS. 12 and 13, it would be understood that each mode switching protocol (from among the plurality of mode switching protocols) may comprise a set of computer implementable instructions for (i) switching a runtime instance of a gaming application software that is under execution, from a resource farming mode to a non-resource farming mode, or (ii) switching a runtime instance of a gaming application software that is under execution, from a non-resource farming mode to a resource farming mode.

It would further be understood that any one or more of the methods or embodiments previously described above in connection with FIGS. 2 to 10 may be implemented for implementing the methods of FIG. 12 or 13.

In an embodiment of the methods of either FIG. 12 or FIG. 13, detecting a gameplay event (i.e. either of the first gameplay event or the second gameplay event) may comprise detecting any of retrieved game settings, virtual machine environment settings, operating system settings, operating system emulator settings, received gameplayer inputs, gameplay action(s) or gameplay outcomes.

In a further embodiment (i) each resource farming mode and corresponding non-resource farming mode may comprise a discrete set of gaming application execution parameters, and or (ii) a first set of gaming application execution parameters corresponding to a resource farming mode is different from a second set of gaming application execution parameters corresponding to a non-resource mode.

In a particular embodiment, a first set of gaming application execution parameters corresponding to a resource farming mode enables implementation of one or more resource optimization techniques for executing the runtime instance of the gaming application software that are not enabled by a second set of gaming application execution parameters corresponding to a non-resource farming mode—wherein said resource optimization techniques include any of virtual central processing unit (vCPU) allocation, central processing unit (CPU) throttling, frame rate throttling, random access memory (RAM) reclaim, graphics scaling, graphics processing unit (CPU) switching, audio scaling and/or audio muting.

In a specific method embodiment, in a resource farming mode, responsive to detecting that a runtime instance of the gaming application software generates threads with specific thread names (i) an independent audio loop corresponding to the runtime instance of the gaming application software is identified, and (ii) the identified independent audio loop is throttled or muted.

In a further embodiment, in a resource farming mode, responsive to identifying a particular sequence of application program interface (API) calls in a specific process thread corresponding to the runtime instance of a gaming application software, wherein the sequence of API calls correspond to graphics threads within a gaming engine for the runtime instance of the gaming application software and do not correspond with physics threads within the gaming engine, a frame rate of the executing instance of the gaming application may be throttled.

In another method embodiment, in a resource farming mode, responsive to determining that the runtime instance of a gaming application software is rendering full scene frames at periodic intervals, frame data corresponding to the executing instance of the gaming application is downscaled or discarded entirely without saving.

In a particular embodiment, in a resource farming mode, responsive to determining that a runtime instance of the gaming application software is rendering scene frames only once, downscaling or discarding of frame data corresponding to the executing instance of the gaming application is accompanied by saving of the frame data prior to downscaling or discarding.

FIG. 14 illustrates an exemplary computer system that is capable of implementing the present invention.

The illustrated system comprises computer system 1402 which in turn comprises one or more processors 1404 and at least one memory 1406. Processor 1404 is configured to execute program instructions—and may be a real processor or a virtual processor. It will be understood that computer system 1402 does not suggest any limitation as to scope of use or functionality of described embodiments. The computer system 1402 may include, but is not be limited to, one or more of a general-purpose computer, a programmed microprocessor, a micro-controller, an integrated circuit, and other devices or arrangements of devices that are capable of implementing the steps that constitute the method of the present invention. Exemplary embodiments of a computer system 1402 in accordance with the present invention may include one or more servers, desktops, laptops, tablets, smart phones, mobile phones, mobile communication devices, tablets, phablets and personal digital assistants. In an embodiment of the present invention, the memory 1406 may store software for implementing various embodiments of the present invention. The computer system 1402 may have additional components. For example, the computer system 1402 may include one or more communication channels 1408, one or more input devices 1410, one or more output devices 1412, and storage 1414. An interconnection mechanism (not shown) such as a bus, controller, or network, interconnects the components of the computer system 1402. In various embodiments of the present invention, operating system software (not shown) provides an operating environment for various softwares executing in the computer system 1402 using a processor 1404, and manages different functionalities of the components of the computer system 1402.

The communication channel(s) 1408 allow communication over a communication medium to various other computing entities. The communication medium provides information such as program instructions, or other data in a communication media. The communication media includes, but is not limited to, wired or wireless methodologies implemented with an electrical, optical, RF, infrared, acoustic, microwave, Bluetooth or other transmission media.

The input device(s) 1410 may include, but is not limited to, a touch screen, a keyboard, mouse, pen, joystick, trackball, a voice device, a scanning device, or any another device that is capable of providing input to the computer system 1402. In an embodiment of the present invention, the input device(s) 1410 may be a sound card or similar device that accepts audio input in analog or digital form. The output device(s) 1412 may include, but not be limited to, a user interface on CRT, LCD, LED display, or any other display associated with any of servers, desktops, laptops, tablets, smart phones, mobile phones, mobile communication devices, tablets, phablets and personal digital assistants, printer, speaker, CD/DVD writer, or any other device that provides output from the computer system 1402.

The storage 1414 may include, but not be limited to, magnetic disks, magnetic tapes, CD-ROMs, CD-RWs, DVDs, any types of computer memory, magnetic stripes, smart cards, printed barcodes or any other transitory or non-transitory medium which can be used to store information and can be accessed by the computer system 1402. In various embodiments of the present invention, the storage 1414 may contain program instructions for implementing any of the described embodiments.

In an embodiment of the present invention, the computer system 1402 is part of a distributed network or a part of a set of available cloud resources.

The present invention may be implemented in numerous ways including as a system, a method, or a computer program product such as a computer readable storage medium or a computer network wherein programming instructions are communicated from a remote location.

The present invention may suitably be embodied as a computer program product for use with the computer system 1402. The method described herein is typically implemented as a computer program product, comprising a set of program instructions that is executed by the computer system 1402 or any other similar device. The set of program instructions may be a series of computer readable codes stored on a tangible medium, such as a computer readable storage medium (storage 1414), for example, diskette, CD-ROM, ROM, flash drives or hard disk, or transmittable to the computer system 1402, via a modem or other interface device, over either a tangible medium, including but not limited to optical or analogue communications channel(s) 1408. The implementation of the invention as a computer program product may be in an intangible form using wireless techniques, including but not limited to microwave, infrared, Bluetooth or other transmission techniques. These instructions can be preloaded into a system or recorded on a storage medium such as a CD-ROM, or made available for downloading over a network such as the Internet or a mobile telephone network. The series of computer readable instructions may embody all or part of the functionality previously described herein.

Based on the above described system and method embodiments, the present invention enables optimization of computer system resource utilization during in-game resource farming.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention as defined the appended claims. Additionally, the invention illustratively disclose herein suitably may be practiced in the absence of any element which is not specifically disclosed herein—and in a particular embodiment specifically contemplated, is intended to be practiced in the absence of any element which is not specifically disclosed herein.

We claim:

1. A method for optimizing computer system resource utilization during in-game resource farming, comprising implementing within a processor based computing device, the steps of:

detecting a first gameplay event that has been defined as a trigger for switching from a first resource farming mode to a first non-resource farming mode, or for switching from a first non-resource farming mode to a first, resource farming mode, in connection with a first runtime instance of a first gaming application software;

identifying a first guest operating system within which the first runtime instance of the gaming application software is being executed within a corresponding first virtual machine within the computing device;

selecting a first mode switching protocol implementable within the identified first guest operating system; and switching the first runtime instance of the gaming application software from a first resource farming mode to a first non-resource farming mode, or from a first non-resource farming mode to a first resource farming mode, by implementing the selected first mode switching protocol.

2. The method as claimed in claim 1, further comprising implementing within the computing device, the steps of:

detecting a second gameplay event that has been defined as a trigger for switching from a second resource farming mode to a second non-resource farming mode, or for switching from a second non-resource farming mode to a second resource farming mode, in connection with a second runtime instance of a second gaming application software, wherein both the first runtime instance of the first gaming application software and the second runtime instance of the second gaming application software are being implemented within the computing device;

identifying a second guest operating system within which the second runtime instance of the gaming application software is being executed within a corresponding second virtual machine within the computing device;

selecting a second mode switching protocol implementable within the identified second guest operating system; and switching the second runtime instance of the gaming application software from a second resource farming mode to a second non-resource farming mode, or from a second non-resource farming mode to a second resource farming mode, by implementing the selected second mode switching protocol.

3. The method as claimed in claim 2, wherein each of the first mode switching protocol and the second mode switching protocol is selected from a plurality of mode switching protocols.

4. The method as claimed in claim 3, wherein each mode switching protocol within the plurality of mode switching protocols is different from other mode switching protocols within the plurality of mode switching protocols.

5. The method as claimed in claim 3, wherein:

one or more other mode switching protocols within the plurality of mode switching protocols are incompatible with the first guest operating system; or one or more other mode switching protocols within the plurality of mode switching protocols are incompatible with the second guest operating system.

6. The method as claimed in claim 2, wherein:

the first resource farming mode is more energy efficient than, or is more computing resource efficient than, or consumes fewer computer resources than the first non-resource farming mode; or the second resource farming mode is more energy efficient than, or is more computing resource efficient than, or consumes fewer computer resources than second non-resource farming mode.

7. A system for optimizing computer system resource utilization during in-game resource farming, comprising a computing device including at least one memory and a processor, and configured for:
   detecting a first gameplay event that has been defined as a trigger for switching from a first resource farming mode to a first non-resource farming mode, or for switching from a first non-resource farming mode to a first, resource farming mode, in connection with a first runtime instance of a first gaming application software;
   identifying a first guest operating system within which the first runtime instance of the gaming application software is being executed within a corresponding first virtual machine within the computing device;
   selecting a first mode switching protocol implementable within the identified first guest operating system; and
   switching the first runtime instance of the gaming application software from a first resource farming mode to a first non-resource farming mode, or from a first non-resource farming mode to a first resource farming mode, by implementing the selected first mode switching protocol.

8. The system as claimed in claim 7, further configured to implement within the computing device, the steps of:
   detecting a second gameplay event that has been defined as a trigger for switching from a second resource farming mode to a second non-resource farming mode, or for switching from a second non-resource farming mode to a second resource farming mode, in connection with a second runtime instance of a second gaming application software, wherein both the first runtime instance of the first gaming application software and the second runtime instance of the second gaming application software are being implemented within the computing device;
   identifying a second guest operating system within which the second runtime instance of the gaming application software is being executed within a corresponding second virtual machine within the computing device;
   selecting a second mode switching protocol implementable within the identified second guest operating system; and
   switching the second runtime instance of the gaming application software from a second resource farming mode to a second non-resource farming mode, or from a second non-resource farming mode to a second resource farming mode, by implementing the selected second mode switching protocol.

9. The system as claimed in claim 8, wherein each of the first mode switching protocol and the second mode switching protocol is selected from a plurality of mode switching protocols.

10. The system as claimed in claim 9, wherein each mode switching protocol within the plurality of mode switching protocols is different from other mode switching protocols within the plurality of mode switching protocols.

11. The system as claimed in claim 9, wherein:
   one or more other mode switching protocols within the plurality of mode switching protocols are incompatible with the first guest operating system; or
   one or more other mode switching protocols within the plurality of mode switching protocols are incompatible with the second guest operating system.

12. The system as claimed in claim 8, wherein:
   the first resource farming mode is more energy efficient than, or is more computing resource efficient than, or consumes fewer computer resources than the first non-resource farming mode; or
   the second resource farming mode is more energy efficient than, or is more computing resource efficient than, or consumes fewer computer resources than second non-resource farming mode.

13. A computer program product for optimizing computer system resource utilization during in-game resource farming, the computer program product comprising a non-transitory computer usable medium having computer readable program code embodied therein, the computer readable program code comprising instructions for implementing at a processor, the steps of:
   detecting a first gameplay event that has been defined as a trigger for switching from a first resource farming mode to a first non-resource farming mode, or for switching from a first non-resource farming mode to a first resource farming mode, in connection with a first runtime instance of a first gaming application software;
   identifying a first guest operating system within which the first runtime instance of the gaming application software is being executed within a corresponding first virtual machine within the computing device;
   selecting a first mode switching protocol implementable within the identified first guest operating system; and
   switching the first runtime instance of the gaming application software from a first resource farming mode to a first non-resource farming mode, or from a first non-resource farming mode to a first resource farming mode, by implementing the selected first mode switching protocol.

* * * * *